US009984701B2

(12) United States Patent
Thornburg et al.

(10) Patent No.: US 9,984,701 B2
(45) Date of Patent: May 29, 2018

(54) NOISE DETECTION AND REMOVAL SYSTEMS, AND RELATED METHODS

(71) Applicant: Apple Inc., Cupertino, CA (US)

(72) Inventors: Harvey D. Thornburg, Sunnyvale, CA (US); Hyung-Suk Kim, San Jose, CA (US); Peter A. Raffensperger, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/200,841

(22) Filed: Jul. 1, 2016

(65) Prior Publication Data

US 2017/0358314 A1 Dec. 14, 2017

Related U.S. Application Data

(60) Provisional application No. 62/348,662, filed on Jun. 10, 2016.

(51) Int. Cl.
*H04B 15/00* (2006.01)
*G10L 21/0232* (2013.01)
*G10L 21/0264* (2013.01)
*G10L 19/02* (2013.01)

(52) U.S. Cl.
CPC .......... *G10L 21/0232* (2013.01); *G10L 19/02* (2013.01); *G10L 21/0264* (2013.01)

(58) Field of Classification Search
CPC .. G10L 21/0264; G10L 19/02; G10L 21/0232
USPC .................................................. 381/94.1, 98
See application file for complete search history.

(56) References Cited

U.S. PATENT DOCUMENTS 8,271,200 B2 9/2012 Sieracki
8,325,939 B1 * 12/2012 King .................. G10L 21/0264 381/94.1
8,428,936 B2 4/2013 Mittal et al.
8,762,138 B2 6/2014 Holtel et al.
8,886,529 B2 11/2014 Faure et al.
(Continued)

OTHER PUBLICATIONS

FabFilter, FabFilter Pro-DS Manual, 2002, All.*
(Continued)

*Primary Examiner* — Vivian Chin
*Assistant Examiner* — Ubachukwu Odunukwe
(74) *Attorney, Agent, or Firm* — Ganz Pollard, LLC

(57) ABSTRACT

Systems and techniques for removing non-stationary and/or colored noise can include one or more of the three following innovative aspects: (1) detection of an unwanted target signal, or component thereof, within an observed signal; (2) removal of the target (component) from the observed signal; and (3) filling of a gap in the observed signal generated by removal of the unwanted target (component). Removal regions, frequency bands, and/or regions of the observed signal used to train the gap filler can be adapted in correspondence with local characteristics of the observed signal and/or the target signal (component). Related aspects also are described. For example, disclosed noise detection and/or removal methods can include converting an incoming acoustic signal to a corresponding machine-readable form. And, a corrected signal in machine-readable form can be converted to a human-perceivable form, and/or to a modulated signal form conveyed over a communication connection.

20 Claims, 21 Drawing Sheets

(56) References Cited

U.S. PATENT DOCUMENTS

| | | | | |
|---|---|---|---|---|
| 9,286,907 | B2 | 3/2016 | Yang et al. | |
| 2007/0021958 | A1 | 1/2007 | Visser et al. | |
| 2008/0118082 | A1 | 5/2008 | Seltzer et al. | |
| 2011/0218799 | A1 | 9/2011 | Mittal et al. | |
| 2013/0132076 | A1 | 5/2013 | Yang et al. | |
| 2014/0126744 | A1 | 5/2014 | Petit et al. | |
| 2015/0248893 | A1* | 9/2015 | Kleijn | G10L 19/02 381/98 |
| 2016/0078880 | A1 | 3/2016 | Avendano et al. | |
| 2016/0133265 | A1 | 5/2016 | Disch et al. | |

OTHER PUBLICATIONS

Esquef, Paulo A.A. "An efficient model-based multirate method for reconstruction of audio signals across long gaps". IEEE Transactions on Audio Speech and Language Processing. 14(4):1391-1400. Jul. 2006.

Drori, I., et al. "Spectral Sound Gap Filling". 2004.

Bartkowiak, M. et al. "Mitigation of Long Gaps in Music Using Hybrid Sinusoidal and Noise Model with Context Adaptation".

Non-Final Office Action in U.S. Appl. No. 15/200,863 dated Jun. 23, 2017.

Final Office Action received in U.S. Appl. No. 15/200,863, dated Feb. 21, 2018, 18 pages.

* cited by examiner

NOISE DETECTION AND REMOVAL SYSTEMS, AND RELATED METHODS

RELATED APPLICATIONS

This application claims benefit of and priority to U.S. Provisional Patent Application No. 62/348,662, filed on Jun. 10, 2016, which application is hereby incorporated by reference in its entirety for all purposes.

BACKGROUND

This application, and the innovations and related subject matter disclosed herein, (collectively referred to as the "disclosure") generally concern systems for detecting and removing unwanted noise in an observed signal, and associated techniques. More particularly but not exclusively, disclosed systems and associated techniques can detect undesirable audio noise in an observed audio signal and remove the unwanted noise in an imperceptible or suitably imperceptible manner. As but one example, disclosed systems and techniques can detect and remove unwanted "clicks" arising from manual activation of an actuator (e.g., one or more keyboard strokes, or mouse clicks) or emitted by a speaker transducer to mimic activation of such an actuator. Some disclosed systems are suitable for removing unwanted noise from a recorded signal, a live signal (e.g., telephony, video and/or audio simulcast of a live event), or both. Disclosed systems and techniques can be suitable for removing unwanted noise from signals other than audio signals, as well.

By way of illustration, clicking a button or a mouse might occur when a user records a video or attends a telephone conference. Such interactions can leave an audible "click" or other undesirable artifact in the audio of the video or telephone conference. Such artifacts can be subtle (e.g., have a low artifact-signal-to-desired-signal ratio), yet perceptible, in a forgiving listening environment.

Solving such a problem involves two different aspects: (1) target-signal detection; and (2) target-signal removal. Detection of a target signal, sometimes referred to in the art as "signal localization" addresses two primary issues: (1) whether a target signal is present; and (2) if so, when it occurred. With a known target signal and only additive white noise, a matched filter is optimal and can efficiently be computed for all partitions using known FFT techniques. The matched filter can be used to remove the target signal.

However, previously known detectors, e.g., based on matched filters, generally are unsuitable for use in real-world applications where target signals are unknown and can vary. For example, the presence of a noise (or "target") signal within an observed signal cannot be guaranteed. Moreover, a noise signal can vary among different frequencies, and a target signal can emphasize one or more frequency bands. Still further, some target signals have a primary component and one or more secondary components.

Thus, a need remains for computationally efficient systems and associated techniques to detect unwanted noise signals in real-world applications, where the presence or absence of a target signal is not known, and where target signals can vary. As well, a need remains for computationally efficient systems and techniques to remove unwanted noise from an observed signal in a manner that suitably obscures the removal processing from a user's perception. Ideally, such systems and techniques will be suitable for removing a variety of classes of target signals (e.g., mouse clicks, keyboard clicks, hands clapping) from a variety of classes of observed signals (e.g., speech, music, environmental background sounds, street noise, café noise, and combinations thereof).

SUMMARY

The innovations disclosed herein overcome many problems in the prior art and address one or more of the aforementioned or other needs. In some respects, the innovations disclosed herein generally concern systems and associated techniques for detecting and removing unwanted noise in an observed signal, and more particularly, but not exclusively for detecting undesirable audio noise in an observed or recorded audio signal, and removing the unwanted noise in an imperceptible manner. For example, disclosed systems and techniques can be used to detect and remove unwanted "clicks" arising from manual activation of an actuator (e.g., one or more keyboard strokes, or mouse clicks), and some disclosed systems are suitable for use with recorded audio, live audio (e.g., telephony, video and/or audio simulcast of a live event), or both.

Disclosed approaches for removing unwanted noise can supplant the impaired portion of the observed signal with an estimate of a corresponding portion of a desired signal. Some embodiments include one or more of the three following, innovative aspects: (1) detection of an unwanted noise (or a target) signal within an observed signal (e.g., a combination of the target signal, for example a "click", and a desired signal, for example speech, music, or other environmental sounds); (2) removal of the unwanted noise from the observed signal; and (3) filling of a gap in the observed signal generated by removal of the unwanted noise from the observed signal. Other embodiments directly overwrite the impaired portion of the signal with the estimate of the desired signal.

Related aspects also are described. For example, disclosed noise detection and/or removal methods can include converting an incoming acoustic signal to a corresponding electrical signal (or other representative signal). As well, the corresponding electrical signal (or other representative signal) can be converted (e.g., sampled) into a machine-readable form. The corresponding electrical signal and/or other representation of the incoming acoustic signal can be corrected or otherwise processed to remove and/or replace a segment corresponding to the impairment in the observed signal. And, a corrected signal can be converted to a human-perceivable form, and/or to a modulated signal form conveyed over a communication connection.

Although references are made herein to an observed signal, impairments thereto, and a corresponding correction to the observed signal, those of ordinary skill in the art will understand and appreciate from the context of those references that they can include corresponding electrical or other representations of such signals (e.g., sampled streams) that are machine-readable.

In some methods, a component of an unwanted target signal can be detected within an observed signal. A width of a removal region of the observed signal can be selected in correspondence with a width of the component of the unwanted target signal such that a measure of the observed signal ahead of the removal region and the measure of the observed signal after the removal region are within a selected range of each other. The component of the unwanted signal can be supplanted with an estimate of a corresponding portion of a desired signal based on the observed signal in a region adjacent the removal region to form a corrected signal. For example, the impaired portion of the signal can be directly overwritten with the estimate.

In other embodiments, the component of the unwanted signal can be removed from the observed signal by removing a corresponding portion of the observed signal within the removal region. A corrected signal can be formed by filling the removed portion of the observed signal with an estimate of a corresponding portion of a desired signal based on the observed signal in a region adjacent the removal region.

In some instances, the region adjacent the removal region can include a region in front of the removal region and a region after the removal region. The estimate of the portion of the desired signal can include a combination of a forward extension of the observed signal from the region in front of the removal region and a backward extension of the observed signal from the region after the removal region.

For example, the forward extension from the region in front of the removal region and/or the backward extension from the region after the removal region can correspond to an autoregressive model of spectral content in the removal region based on the observed signal in the region in front of and/or after the removal region, respectively. In some instances, the forward and the backward extensions are different and can be cross-faded with each other to provide an imperceptible or nearly imperceptible correction to the observed signal.

In some instances, the component of the unwanted target signal within the removal region includes content of the observed signal within a selected frequency band. The content of the observed signal within the selected frequency band can be removed, and the removed portion of the observed signal can be filled with an estimate of content of the desired signal within the frequency band.

In some instances, the component of the unwanted target signal is a first component of the unwanted target signal. Some described methods search for and can detect one or more other components of the unwanted target signal. In such instances, the removal region is a first removal region corresponding to the first component, a width of a removal region of the observed signal corresponding to each of the one or more other components of the unwanted target signal can be selected.

At least two of the removal regions can be merged together when a separation between the respective removal regions is below a lower threshold separation.

In addition, or alternatively, at least two of the removal regions can be grouped together when a separation between the respective removal regions is below an upper threshold separation. The grouped removal regions can be sorted, or ordered, according to width from smallest width to largest width. Each respective removal region of the observed signal can be supplanted in order from smallest width to largest width.

In some methods, a width of the region adjacent the removal region can be selected based at least in part on a measure of signal variation within a portion of the observed signal positioned adjacent the removal region. For example, the width can be selected to maintain variation of the portion of the observed signal within the region adjacent the removal region below a predetermined upper threshold variation.

In some instances, the corrected signal can be transformed into a human-perceivable form, and/or transformed into a modulated signal conveyed over a communication connection.

Also disclosed are tangible, non-transitory computer-readable media including computer executable instructions that, when executed, cause a computing environment to implement one or more methods disclosed herein. Digital signal processors (DSPs) suitable for implementing such instructions are also disclosed. Such DSPs can be implemented in software, firmware, or hardware.

The foregoing and other features and advantages will become more apparent from the following detailed description, which proceeds with reference to the accompanying drawings.

BRIEF DESCRIPTION OF THE DRAWINGS

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation.

DETAILED DESCRIPTION

The following describes various innovative principles related to noise-detection and noise-removal systems and related techniques by way of reference to specific system embodiments. For example, certain aspects of disclosed subject matter pertain to systems and techniques for detecting unwanted noise in an observed signal, and more particularly but not exclusively to systems and techniques for correcting an observed signal including non-stationary and/or colored noise. Embodiments of such systems described in context of specific acoustic scenes (e.g., human speech, music, vehicle traffic, animal activity) are but particular examples of contemplated detection, removal, and correction systems, and examples of noise described in context of specific sources or types (e.g., "clicks" generated from manual activation of an actuator) are but particular examples of environmental signals and noise signals, and are chosen as being convenient illustrative examples of disclosed principles. Nonetheless, or more of the disclosed principles can be incorporated in various other noise detection, removal, and correction systems to achieve any of a variety of corresponding system characteristics.

Thus, noise detection, removal, and correction systems (and associated techniques) having attributes that are different from those specific examples discussed herein can embody one or more presently disclosed innovative principles, and can be used in applications not described herein in detail, for example, in telephony or other communications systems, in telemetry systems, in sonar and/or radar systems, etc. Accordingly, such alternative embodiments can also fall within the scope of this disclosure.

I. Overview

Figure 1:
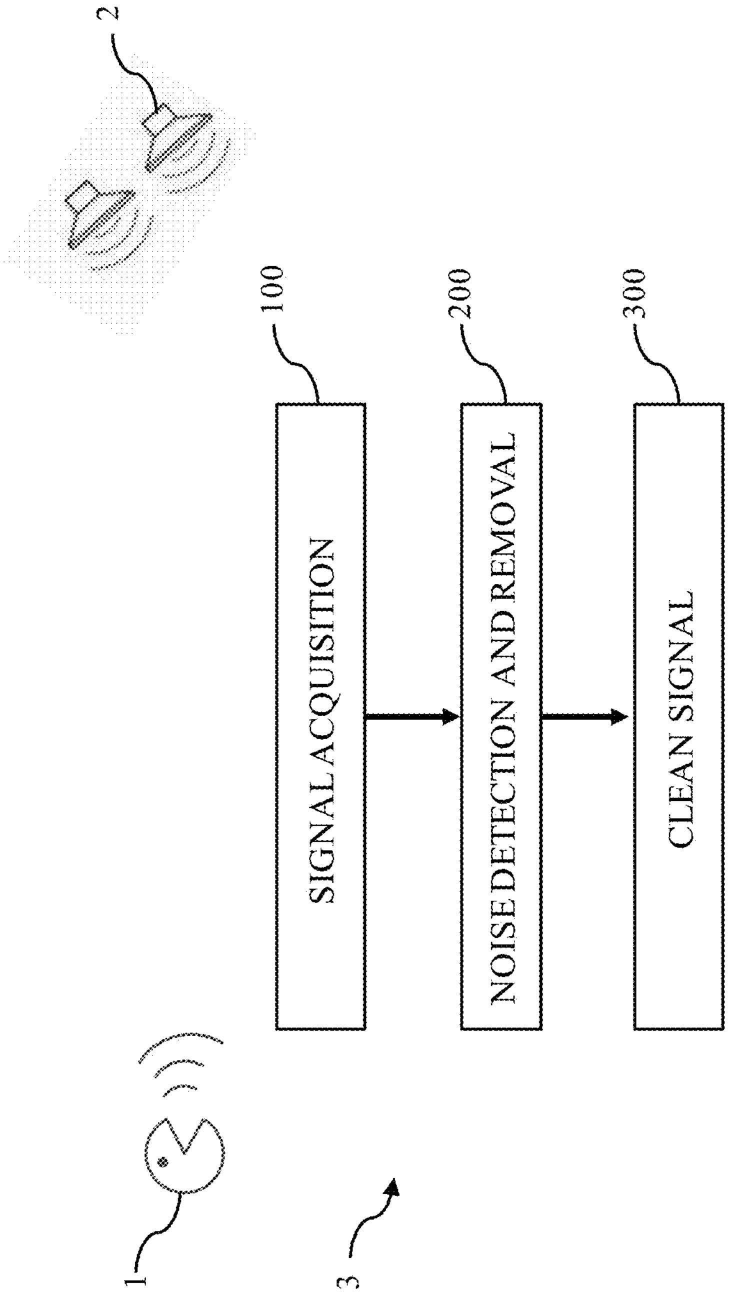
FIG. 1 illustrates a block diagram of an example of a signal processing system suitable to remove unwanted noise from an observed signal.
Figure 2:
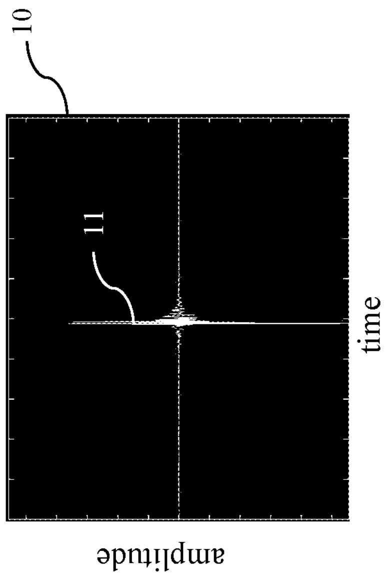
FIG. 2 illustrates a plot of but one example of a signal containing unwanted noise.
Figure 3:
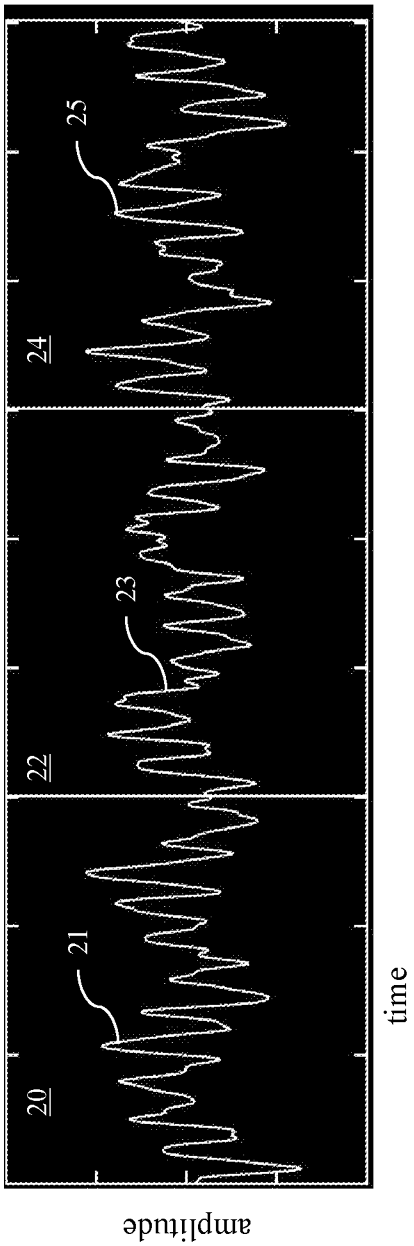
FIG. 3 illustrates a plot of an example of an "clean" (or "desired" or "intended") signal free of noise.

This disclosure concerns methods for detecting and/or removing an unwanted target signal from an observed signal. FIG. 1 schematically depicts one particular example of a noise-detection-and-removal system 3. FIG. 2 shows a frame 10 containing a noise signal 11 absent any other signals. FIG. 3 shows several frames 20, 22, 24 containing a "clean" signal 21, 23, 25. In some circumstances, however, a noise signal as in FIG. 2 can combine with and impair, for example, an intended recording of a clean signal as in FIG. 3. A system as in FIG. 1 can detect and remove the undesired noise (or target) signal.

The system 3 includes a signal acquisition engine 100 configured to observe a given, e.g., audio, signal 1, 2. The system 3 also includes a noise-detection-and-removal engine 200 configured to detect and remove unwanted components in the observed signal. In some examples, the engine 200 also includes a gap-filler configured to estimate a desired portion of the observed signal in regions that were removed by the engine 200. The illustrated system also includes a clean-signal engine 300 configured to further process the observed signal after the unwanted components are removed and the resulting gaps filled with an estimate of the desired portion of the observed signal. Although such an estimate might, and often does, differ from the original desired portion of the observed signal, estimates derived using approaches herein are perceptually equivalent, or acceptable perceptual equivalents, to the original, unimpaired version of a desired signal. Such perceptual equivalence, and acceptable levels of perceptual equivalence, are discussed more fully below in relation to user tests.

Disclosed approaches for removing unwanted noise, as in the engine 200, can include one or more of the three following innovative aspects: (1) detection of an unwanted noise (or a target signal) within an observed signal (e.g., a combination of the target signal, like a "click", and a desired signal, like speech, music, or other environmental sounds); (2) removal of the unwanted noise from the observed signal; and (3) filling of a gap in the observed signal generated by removal of the unwanted noise from the observed signal. Unlike conventional systems, e.g., based on matched filtering, disclosed noise detection and/or removal systems can detect and/or remove an impairment signal in the presence of non-stationary, colored noise.

Some disclosed systems can be trained with clean representations of different classes of target signals 11 (FIG. 2) (e.g., hand claps, mouse clicks, button clicks, etc.) alone or in combination with a variety of representative classes of desired signal 12 (FIG. 3) (e.g., speech, music, environmental signal). Such systems can include models approximating probability distributions of duration for various classes of target signals. For example, training data representative of various types of acoustic activities can tune statistical models of duration, probabilistically correlating acoustic signal characteristics to earlier events, like a software or hardware notification that a mechanical actuator has been actuated.

Figure 4:
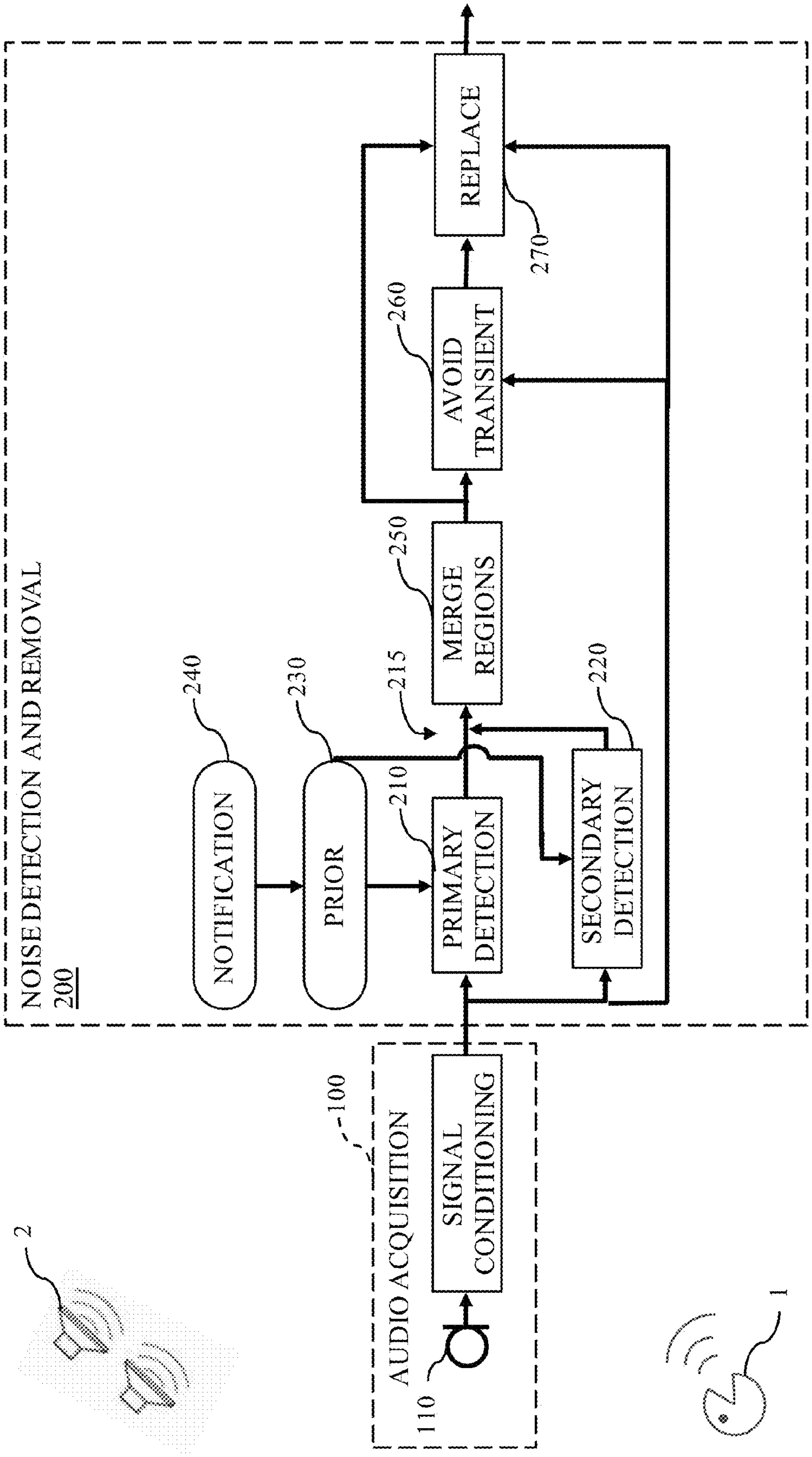
FIG. 4 illustrates a block diagram of a signal processing system suitable to remove unwanted acoustic noise from an observed acoustic signal.

The block diagram in FIG. 4 illustrates details of a noise-detection-and-removal system similar to the system shown in FIG. 1. Although the system shown in FIG. 1 generally pertains to unwanted noise in observed signals of various types, the system shown in FIG. 4 is shown in context of processing audio signals as an expedient, for convenience, and to facilitate a succinct disclosure of innovative principles. That being said, the concepts discussed in relation to FIG. 4 in context of audio signal processing are applicable, generally, to the system shown in FIG. 1 and to processing other types of signals. Thus, such discussion, and this disclosure, are not limited to the principles discussed in relation to audio acquisition, audio rendering (e.g., playback), audio signal processing, audio noise, etc. Instead, such discussion, and this disclosure, are generally applicable in relation to acquisition, rendering, processing, noise, etc., of other types of signals, as one of ordinary skill in the art will appreciate following a review of this disclosure.

As shown in FIG. 4, a noise-detection-and-removal system can have a signal acquisition engine 100 and a transducer 110 configured to convert environmental signals 1, 2 to, e.g., an electrical signal. In FIG. 4, the transducer 110 is configured as a microphone transducer suitable for converting an audible signal to an electrical signal. The illustrated acquisition engine 100 also includes an optional signal conditioner, e.g., to convert an analog electrical signal from the microphone into a digital signal or other machine-readable representation.

The system shown in FIG. 4 also includes a noise-detection-and-removal engine 200. Generally, a noise-detection-and-removal engine 200 is configured to detect an unwanted impairment signal (or target signal) within an incoming signal representation received from the signal-acquisition engine 100, to remove that target signal, and to emit or otherwise output a "clean" signal.

The incoming signal is sometimes referred to herein as an "observed signal." Ideally, the "clean" signal contains all of the desired aspects of the observed signal and none of the target signal. In practice, the "clean" signal loses a small measure of the desired aspects of the observed signal and, at least in some instances, retains at least an artifact of the target signal. Some disclosed approaches eliminate or at least render imperceptible such artifacts in many contexts.

Figure 5:
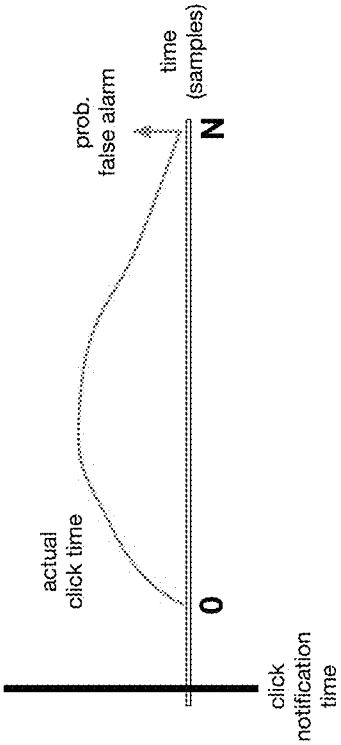
FIG. 5 illustrates an example of a probability distribution function reflecting a likelihood that an observed signal is influenced by unwanted noise a selected time following notification of an occurrence typically associated with unwanted noise (e.g., a mouse click or other activation of an actuator).

Referring still to FIG. 4, a primary detection engine 210 and a secondary detection engine 220 can be configured to detect primary and secondary components, respectively, of a target signal in an incoming observed signal. Detection in each engine 210, 220 can be informed by a known prior probability 230 of a target signal being present, as when a notification flag 240 or other input to the detection engines indicates an actuator or other noise source has been activated. FIG. 5 illustrates but one schematic example of a probability distribution reflecting a probability that an unwanted target signal is present at various times following notification of an event that could give rise to the unwanted target signal (e.g., a notification of a mouse click).

Referring again to FIG. 4, one or more detected noise components 215 can be grouped or merged within an initial removal region of the observed signal, as indicated at 250. (See also, FIGS. 16 through 23, and related description.) If a boundary of the removal region falls in a transient region of the observed signal, an artifact of the transient region is likely to remain in the "clean" signal output. To mitigate or eliminate such artifacts, the engine 260 can adapt a size of the removal region so the boundary falls ahead of or behind the transient region.

Once the region(s) of the observed signal for removal are defined (e.g., regardless of whether the removal region was adapted to avoid a transient or remained unchanged), the engine 270 can supplant the portions of the observed signal dominated by or otherwise tainted by the unwanted target signal with an estimate of the desired signal within the removal region, and output a "clean" signal.

Related aspects also are disclosed. For example, a corrected (or "clean") signal can be converted to a human-perceivable form, and/or to a modulated signal form conveyed over a communication connection. Also disclosed are machine-readable media containing instructions that, when executed, cause a processor of, e.g., a computing environment, to perform disclosed methods. Such instructions can be embedded in software, firmware, or hardware. In addition, disclosed methods and techniques can be carried out in a variety of forms of signal processor, again, in software, firmware, or hardware.

Additional details of disclosed noise-detection-and-removal systems and associated techniques and methods follow.

II. Audio Acquisition

As used herein, the phrase "acoustic transducer" means an acoustic-to-electric transducer or sensor that converts an incident acoustic signal, or sound, into a corresponding electrical signal representative of the incident acoustic signal. Although a single microphone is depicted in FIG. 4, the use of plural microphones is contemplated by this disclosure. For example, plural microphones can be used to obtain plural distinct acoustic signals emanating from a given acoustic scene 1, 2, and the plural versions can be processed independently or combined before further processing.

The audio acquisition module 100 can also include a signal conditioner to filter or otherwise condition the acquired representation of the incident acoustic signal. For example, after recording and before presenting a representation of the acoustic signal to the noise-detection-and-removal engine 200, characteristics of the representation of the incident acoustic signal can be manipulated. Such manipulation can be applied to the representation of the observed acoustic signal (sometimes referred to in the art as a "stream") by one or more echo cancelers, echo-suppressors, noise-suppressors, de-reverberation techniques, linear-filters (EQs), and combinations thereof. As but one example, an equalizer can equalize the stream, e.g., to provide a uniform frequency response, as between about 150 Hz and about 8,000 Hz.

The output from the audio acquisition module 100 (i.e., the observed signal) can be conveyed to the noise-detection-and-removal engine 100.

III. Target Signal Detection

Figure 7:
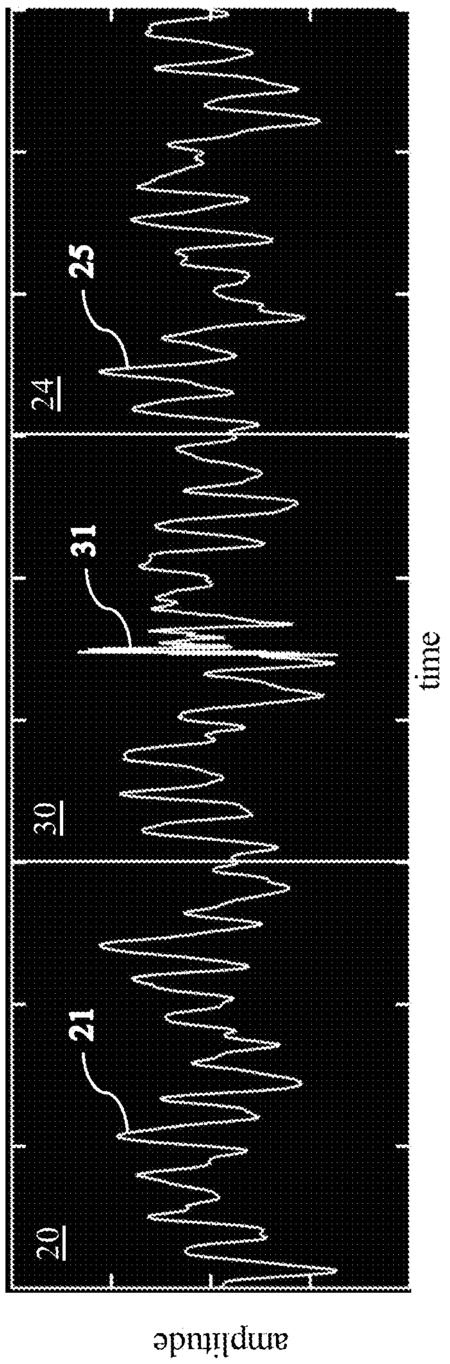
FIG. 7 illustrates a portion of an observed signal including a region having unwanted noise, as well as a region before and a region after the region of unwanted noise.

Referring now to FIG. 7, the observed signal 21, 31, 25 can include a component 31 of an undesirable target signal. In general, however, whether an observed signal contains an undesirable target signal is unknown a priori. This section describes techniques for detecting a target signal.

Detection of a target signal, sometimes referred to in the art as "signal localization" addresses two primary issues: (1)

whether a target signal is present; and (2) if so, when it occurred. With a known target signal and only additive white noise, a matched filter is optimal and can efficiently be computed for all partitions using known FFT techniques.

$$H_{opt}(y) = \arg\max_{m} \sum_{n=-\infty}^{\infty} y_n s_{n-m}$$

However, in the real world, presence of a target signal within an observed signal cannot be guaranteed, though prior information about presence and location (e.g., time) of a target signal might be available. For example, as noted in the brief discussion of FIG. 5, above, some systems provide a notification of an event associated with an unwanted target signal, and a distribution of probability that the unwanted target signal is present at various times following the notification might be available (e.g., from training the system with different types of target signals and events).

In general, though, target signals are unknown and can vary in time and among frequency bands. As well, environmental noise typically is neither stationary nor white. Thus, a matched filter is not typically optimal, and in some instances is unsuitable, for detecting target signals in real-world scenarios.

Disclosed detectors account for colored and non-stationary observed signals through training a likelihood model over various different observed signals (e.g., so-called "signal plus noise"). Such training can include stationary white noise, non-stationary white noise (plus noise estimation) and noise with stationary coloration. As discussed more fully below, using FFT techniques, disclosed solutions can have complexity on the order of N log N, where N represents the number of partitions in an observed signal, $y_{0:N-1}$. A prototype signal $s_{0:N-1}$ can be defined, and assumed unwanted target signals can be assumed to have L partitions, where L is substantially less than N. Accordingly, a subspace constraint and prior information can be imposed:

$$s=\Phi S, \Phi \in \mathcal{R}^{N \times J}, \text{ orthonormal basis}$$

$$S \sim \mathcal{N}(\mu_S, \Sigma_S)$$

The parameters $\Phi$, $\mu_S$, $\Sigma_S$ can be learned from clean examples of the prototype signal. With a circular shift of the prototype, a value of the signal at a selected partition, n, can be determined:

$$s_n = P_n s = [P_n \Phi] S$$

$$s_n = \Phi_n S, \Phi_n \triangleq P_n \Phi$$

Hypotheses regarding the presence of a target signal, and associated cost functions, can be defined. In the following, the term "signal" refers to a target or impairment signal, rather than a desired signal.

$H = n \in 0: N-1$: signal present at time n
$H = N$: signal not present
$C(m, n)$: cost of detecting $H = n$ when $H = m$:
$C_{MISS}$: $m \neq N$, $n = N$
$C_{FA}$: $n \neq N$, $m = N$
0: $m = n = N$
$1 - \frac{|m-n|}{L}$, $|m-n| < L$
1, otherwise
$C_{MISS} + C_{FA} = 1$ Next, the expected cost C(m,n) can be minimized over H and y, with the closed-form equation:

$$H_{opt}(y) = \arg\max_{m} \sum_{n=0}^{N} C(m, n) P(H = n \mid y)$$

Recognizing that Bayes' rule is that the posterior probability is proportional to the prior probability times a likelihood $$P(H=n|y) \propto P(H=n) P(y|H=n),$$

the posterior $$P(H=n|y)$$

can be computed over n provided that the prior probability $$P(H=n)$$

and the likelihood $$P(y|H=n):$$

are available, as from, for example, training data based on button notifications and accuracy models. Otherwise, the prior can be assumed to be flat, or constant, in the absence of specific information. The likelihood can be thought of as a "shifted signal plus noise" model, and the hypothesis values can be as follows:

Signal present: $H=n \in 0:N-1$

Signal absent: $H=N$

In context of actuation of a mechanical actuator, the prior can be a log-normal model, and a probability of a false-alarm $$P(H=N)$$

can be fixed (e.g., at a value of 0.001, or some other tuned value), as generally indicated in FIG. 5. Some disclosed target signal detectors have a likelihood model for stationary white noise that differs from the likelihood model for non-stationary white noise, and yet another likelihood model for colored noise.

For stationary white noise, the likelihood of a target signal being present can be modeled as $$P(y|H=n) = \mathcal{N}(\Phi_n \mu_s, \Phi_n \Sigma_s \Phi_n^T + \sigma_y^2 I_N) \quad (1)$$

and the likelihood of a target signal being absent can be modeled as $$P(y|H=N) = \mathcal{N}(0, \sigma_y^2 I_N)$$

The noise variance $$\sigma_y^2,$$

can be estimated in regions immediately before and after, e.g., at partitions 0 and N−1. The complexity of the foregoing if directly evaluated is on the order of $N^{3.373}$, though the complexity can be reduced to be on the order of N log N using an FFT approach. The following can be evaluated for all partitions, n $$(y-\Phi_n \mu_s)^T (\sigma_y^2 \mathcal{I}_N + \Phi_n \rho_s \Phi_n^T)^{-1} (y - \Phi_n \mu_s) \quad (2)$$

The Matrix Inversion Lemma can reduce N×N matrices to be J×J:

$$(\sigma_y^2 I_N + \Phi_n \Sigma_s \Phi_n^T)^{-1} = \sigma_y^{-2} (I_N - \sigma_y^{-2} \Phi_n \Omega_s^{-1} \Phi_n^T)$$

where $\Omega_s \in \mathcal{R}^{J \times J}$:

$$\Omega_s \triangleq \Sigma_s + \sigma_y^{-2} I_J$$

Inverting $\Omega_S$ has a complexity on the order of $J^3$, and Equation (2) can reduce to $$A+B$$

where $$A \triangleq \sigma_y^{-2}(y^T y+\mu_s^T \mu_s)-\sigma_y^{-4}\mu_s^T \Omega_s^{-1}\mu_s$$

$$B \triangleq -\sigma_y^{-2}2\mu_s^T Y_n-\sigma_y^{-4}(2\mu_s^T-Y_n)\Omega_s^{-1}Y_n$$

where $Y_n \triangleq \Phi_n^T y$.

All $Y_n$ can be computed with complexity on the order of N log N via FFT.

Define $W_j[n] \triangleq Y_n[j]$, then $$\begin{aligned} W_j[n] &= \phi_{j,n}^T y \\ &= \sum_{m=0}^{N-1} \phi_{j,n}[m] y[m] \\ &= \sum_{m=0}^{N-1} \phi_j[(m-n) \bmod N] y[m] \\ &= y[n] \odot \phi_j[-n] \end{aligned}$$

where $\odot$ denotes circular convolution.

$\rightarrow W_j[n]=\mathrm{IDFT}\{\mathrm{DFT}\{y[n]\}\cdot\mathrm{DFT}\{\phi_j[-n]\}\}$ The input signal y can be filtered (circularly) by each of the reversed basis vectors $$\phi_{j,n}.$$

If the impairment signal s is completely known, there is only one basis vector (the matched filter:

$$\Phi_{0,n} = \frac{s}{|s|}$$

When the prior is flat, the peak of the matched filter output can be taken, as noise variance is less or not important. However, when the prior is not flat, noise variance estimation can become more significant.

1. Non-Stationarity

In the case of non-stationary white noise, the noise can have a different variance with each sample:

$$P(y|s,H=n)=\mathcal{N}(s_n,\Sigma_y), n \in 0:N-1$$

where $$\Sigma_y=\mathrm{diag}(\sigma_{y,0}^2,\sigma_{y,1}^2, \ldots ,\sigma_{y,N-1}^2)$$

The likelihood for non-stationary white noise can be modeled as follows:

Signal present:

$$P(y|H=n)=\mathcal{N}(\Phi_n\mu_s,\Phi_n\Sigma_s\Phi_n^T+\Sigma_y)$$

Signal absent:

$$P(y|H=N)=\mathcal{N}(0,\Sigma_y) \tag{3}$$

Define $U_n \in \mathcal{R}^{N\times N}$:

$$U_n=[\Phi_n|\Gamma_n] \tag{4}$$

$\Gamma_n \triangleq P_n\Gamma$; $\Gamma \in \mathcal{R}^{N\times(N-J)}$=orth. comp. basis Existence of $\Gamma$ guaranteed by Gram-Schmidt Change of variables: $y \rightarrow U_n^T y$; Jacobian=1

Signal present:

$$P(y \mid H = n) = \mathcal{N}\left(U_n^T y \middle| \begin{bmatrix} \mu_s \\ 0 \end{bmatrix}, U_n^T \sum_y U_n + \begin{bmatrix} \sum_s & 0 \\ 0 & 0 \end{bmatrix}\right)$$

Thus, $$\log P(y \mid H = n) = -\frac{1}{2}(A + B)$$

where $$A \triangleq N \log 2\pi + \log \left| U_n^T \sum_y U_n + \begin{bmatrix} \sum_s & 0 \\ 0 & 0 \end{bmatrix} \right| \tag{5}$$

$$B \triangleq z_n^T \left( U_n^T \sum_y U_n + \begin{bmatrix} \sum_s & 0 \\ 0 & 0 \end{bmatrix} \right)^{-1} z_n$$

and $$z_n \triangleq U_n^T y - \begin{bmatrix} \mu_s \\ 0 \end{bmatrix}$$

To simplify Equation (5), the following is useful $$\begin{aligned} \left( U_n^T \sum_y U_n + \begin{bmatrix} \sum_s & 0 \\ 0 & 0 \end{bmatrix} \right)^{-1} &= U_n^T \left( \sum_y + U_n \begin{bmatrix} \sum_s & 0 \\ 0 & 0 \end{bmatrix} U_n^T \right)^{-1} U_n \\ &= U_n^T \left( \sum_y + \Phi_n \sum_s \Phi_n^T \right)^{-1} U_n \end{aligned}$$

$$U_n z_n = y - \Phi_n \mu_s$$

Thus, after substantial computations, e.g., Schur complements, Matrix Inversion Lemma, etc., A and B can be expressed in terms of scalar quantities, J×J matrices $\Omega_{s,n}^{-1}$, $\psi_{s,n}$ and a J×1 vector $\zeta_{s,n}$ as follows:

$$A=N \log 2\pi+\log|\Sigma_y|+\log|\Sigma_s|+\log|\Omega_{s,n}|$$

$$B=y^T\Sigma_y^{-1}y-2\mu_s^T\zeta_{s,n}+\mu_s^T\psi_{s,n}\mu_s-\zeta_{s,n}^T\Omega_{s,n}^{-1}\zeta_{s,n}+ 2\mu_s^T\psi_{s,n}\Omega_{s,n}^{-1}\zeta_{s,n} \ldots -\mu_s^T\psi_{s,n}\Omega_{s,n}^{-1}\psi_{s,n}\mu_s$$

Defining the following intermediate quantities, $$\psi_{s,n} \triangleq \Phi_n^T\Sigma_y^{-1}\Phi_n$$

$$\Omega_{s,n} \triangleq \Sigma_s^{-1}+\psi_{s,n}$$

$$\zeta_{s,n} \triangleq \Phi_n^T\Sigma_y^{-1}y \tag{6}$$

direct evaluation of the foregoing via Equation (6) can have a complexity for all n on the order of $N^2$, whereas using on the order of $J^2$ FFTs, the complexity can be reduced to be on the order of N log N.

Define $W \in \mathcal{R}^{J\times N}$, $V \in \mathcal{R}^{J\times J\times N}$ $$W[j, n] \triangleq \zeta_{s,n}[j]$$

$$V[i, j, n] \triangleq \Psi_{s,n}[i, j]$$

Let $\bar{y} \triangleq \sum_y^{-1} y$.

Then $$\begin{aligned} W[j, n] &= \sum_{m=0}^{N-1} \bar{y}[m]\phi_j[(m-n) \bmod N] \\ &= \bar{y}[n] \odot \phi_j[-n] \\ &= IDFT\{DFT\{\bar{y}[n]\} \cdot DFT\{\phi_j[-n]\}\} \end{aligned}$$

-continued $$
\begin{aligned}
V[i, j, n] &= \sum_{m=0}^{N-1} \sigma_m^{-2}\phi_i[(m-n) \bmod N]\phi_j[(m-n) \bmod N] \\
&= \sigma_y^{-2}[n] \odot (\phi_i[-n] \cdot \phi_j[-n]) \\
&= IDFT\{DFT\{\sigma_y^2[n]\} \cdot DFT\{\phi_i[-n] \cdot \phi_j[-n]\}\}
\end{aligned}
$$

Figure 6:
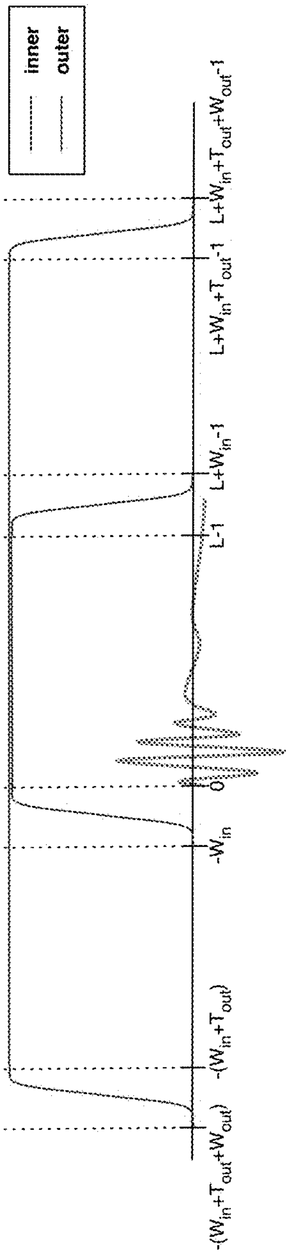
FIG. 6 schematically illustrates a pair of sliding masks arranged to facilitate detection of an impairment signal within an observed signal.

Assuming a width L of an undesired target (sometimes referred to as an "impairment") signal is substantially less than the number of partitions N, the variance $\sigma_{y,n}^2$ of nonstationary white noise can be estimated as a mask-weighted average of $y_n^2$ in relation to two sliding masks arranged as in FIG. 6. The weighting can equal the outer mask times (1—Inner mask). In this approach, no circular shift is used; rather outside 0:N−1 can be padded.

Stated differently, disclosed systems estimate a region where target signal occurs. Such a system can assume a target signal is short in duration relative to an observed, time-varying signal. The system can estimate noise variance over a moving window and assume that a target signal is centered within the window.

As but one example for making such an estimate, two sliding masks can be used, with an inner mask having a temporal width selected to correspond to a width of a given target signal, and an outer mask can have a selected look-ahead and look-back width relative to the inner mask. The inner mask can be centered within the outer mask. The estimated noise variance can be a mask-weighted average of a square of the observed signal.

Alternatively, an expectation maximization approach can be used to formalize the sliding mask computations, but the computational overhead increases.

In any event, disclosed target signal detectors can assess each of a plurality of regions of an observed signal to determine whether the respective region includes a component of an unwanted target signal. Each region spans a selected number of samples of the observed signal, and the selected number of samples in each region is substantially less than a total number of samples of the observed signal. Such approaches are suitable for a variety of unwanted target signals, including a stationary signal, a non-stationary signal, and a colored signal.

2. Detection in "Colored" Noise: A "Whitening" Approach

Noise can vary among different frequencies, and a target signal can emphasize one or more frequency bands. General noise detectors can incorporate a so-called multiband detector. For example, each band can have a corresponding set of subspaces. Under such approaches, model complexity can increase and can require additional data for training. As well, additional computational cost can be incurred, but some disclosed systems assess a plurality of frequency bands within each region to determine whether the respective region includes a component of the unwanted target signal within one or more of the frequency bands Nonetheless, with many signals (less true for music and speech), the degree of noise coloration can be approximately constant. That assumption can be better suited for signals with lower frequency resolutions and arbitrary impulse-like excitations are still possible. A noise coloration model can be employed:

*LPC* (circulant model): let $$y_n = e_n - \sum_{m=1}^{p} w_m y_{(n-m) \bmod N}$$

-continued $$e = Wy$$

$$e \sim \mathcal{N}\left(0, \sum_e\right)$$

$$\sum_e \triangleq \mathrm{diag}(\sigma_{e,0}^2, \sigma_{e,1}^2, \ldots, \sigma_{e,N-1}^2)$$

$W \in \mathcal{R}^{N \times N}$ is a circulant matrix, with $$W[m, n] = \begin{cases} 1, & m = n \\ w_k, & (n-m) \bmod N = k,\ 1 \le k \le p \\ 0, & \text{otherwise} \end{cases}$$

Despite having a circulant model, pad regions and Burg's method can be used to estimate the $w_k$ and $e_n$.

Disclosed detectors can transform observed signals to "whiten" them. After whitening, the detector can apply non-stationary signal detection to an observed signal as described above. For example, the likelihood model can include a change of variables relative to the stationary white noise model (e.g., y becomes e; constant Jacobian).

$$P(y \mid H = n) \propto P(e \mid H = n) = \mathcal{N}\left(W\Phi_n\mu_s,\ W\Phi_n \sum_s \Phi_n^T W^T + \sum_e\right)$$

can be simplified using $$\Phi_n \triangleq P_n \Phi$$

and, since W and Pn are circulant, multiplication can be interchanged:

$$W\Phi_n = P_n(W\Phi)$$

Although the columns $W\Phi_n$ are not orthonormal, Gram-Schmidt can be applied:

$$W\Phi = \Phi' V,$$

$$\Phi' \in \mathcal{R}^{N \times J}$$

$$V \in \mathcal{R}^{J \times J}$$

Defining $$\Phi'_n \triangleq P_n \Phi'$$

$$\mu'_s \triangleq V\mu_s$$

$$\Sigma'_s \triangleq V\Sigma_s V^T$$

it follows that:

$$P(e \mid H=n) = \mathcal{N}(\Phi'_n\mu'_s, \Phi'_n\Sigma'_s\Phi'^T_n + \Sigma_e) \tag{7}$$

which reduces the problem to that of non-stationary white noise:

$$\zeta'_{s,n} \triangleq \Phi'^T_n \Sigma_e^{-1} e$$

$$\psi'_{s,n} \triangleq \Phi'^T_n \Sigma_e^{-1} \Phi'_n$$

$$\Omega'_{s,n} \triangleq \Sigma'^{-1}_s + \psi'_{s,n}$$

Thus, after whitening of the colored signal, noise detection as described above in connection with the non-stationary white noise can proceed.

3. Training

Systems as disclosed herein can be trained using a database of button click sounds (or any other template for a target signal) recorded over a domain of interest. That template can then be recorded in combination with a variety of different environments (e.g., speech, automobile traffic, road noise, music, etc.). Disclosed systems then can be trained to adapt to detect and localize the target signal when in the presence of arbitrary, non-stationary signals/noises (e.g., music, etc.). Such training can include tuning a plurality of model parameters against one or more representative unwanted signals, one or more classes of environmental signals, and combinations thereof.

For example, in a working embodiment, a noise detector was trained to detect unwanted audible sounds. To train the detector, raw audio (e.g., without processing) of several unwanted noise signals (e.g., slow, fast, and rapid "clicks", button taps, screen taps, and even rubbing of hands against an electronic device) were acquired in connection with different devices and stored. For example, two minutes of unperturbed, unwanted noise signals were obtained with minimal or no other audible noise. As well, samples of several classes of desired signals (e.g., music, speech, environmental sounds, or textures, including traffic audio, café audio) were recorded with a similar raw device configuration.

IV. Noise Removal

Referring now to FIG. 7, one or more portions 31 of the the observed signal 21, 31, 25 impaired by detected components of an unwanted target signal can be supplanted by an estimate of a corresponding portion of a desired signal to be observed. For example, a desired signal to be observed can include audible portions of a child's school performance, and certain segments of the observed signal can be impaired, as by "clicks" of shutters of nearby cameras. Alternatively, certain segments of the observed audio signal can be impaired by a user activating an actuator. In either event, detection systems disclosed herein can identify and localize one or more portions of the observed recording impaired by such unwanted noise. Those one or more portions of the observed recording can be supplanted with an estimate of the desired signal, in this example an estimate of the audible portion of the child's school performance.

Figure 8:
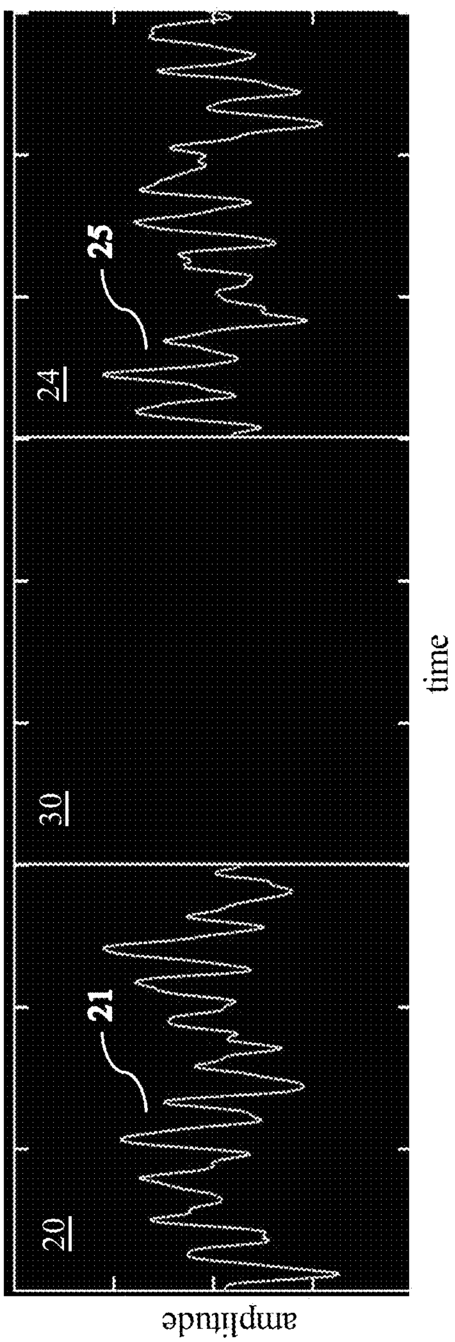
FIG. 8 illustrates the observed signal shown in FIG. 7 with a segment of the signal removed.
Figure 11:
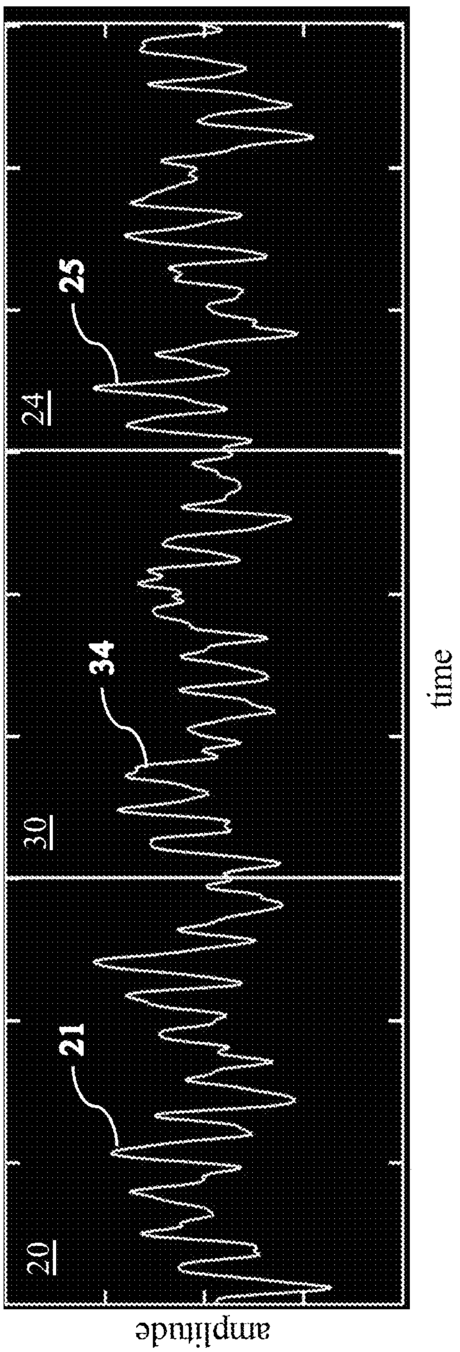
FIG. 11 illustrates the processed signal after cross-fading the signal extensions shown in FIGS. 10A and 10B with each other.

In some instances, a frame 30 containing the impairment signal 31 can be removed (e.g., deleted) from the observed signal and the resulting empty frame (e.g., FIG. 8) can subsequently be replaced with an estimate 34 (FIG. 11). In other instances, the estimate 34 can be determined and directly overwritten on the impairment signal 31 within the observed signal. In either approach, a corrected signal is formed by supplanting an impaired portion of the observed signal with an estimate of a corresponding portion of a desired signal.

For clarity in describing available techniques to develop the estimate, the remainder of this description proceeds by way of reference to a two-step approach—removal followed by gap-filling. Nonetheless, those of ordinary skill in the art will appreciate that described techniques to develop the estimate can be employed in removal by directly overwriting a frame of the observed signal with the estimate. The frame 30 containing the impaired segment 31 is sometimes referred to as a "removal region," despite that the impaired segment 31 can be removed and the resulting gap filled, or that the impaired segment 31 can be directly overwritten.

V. Estimate of Desired Signal

1. Overview

Figure 10A:
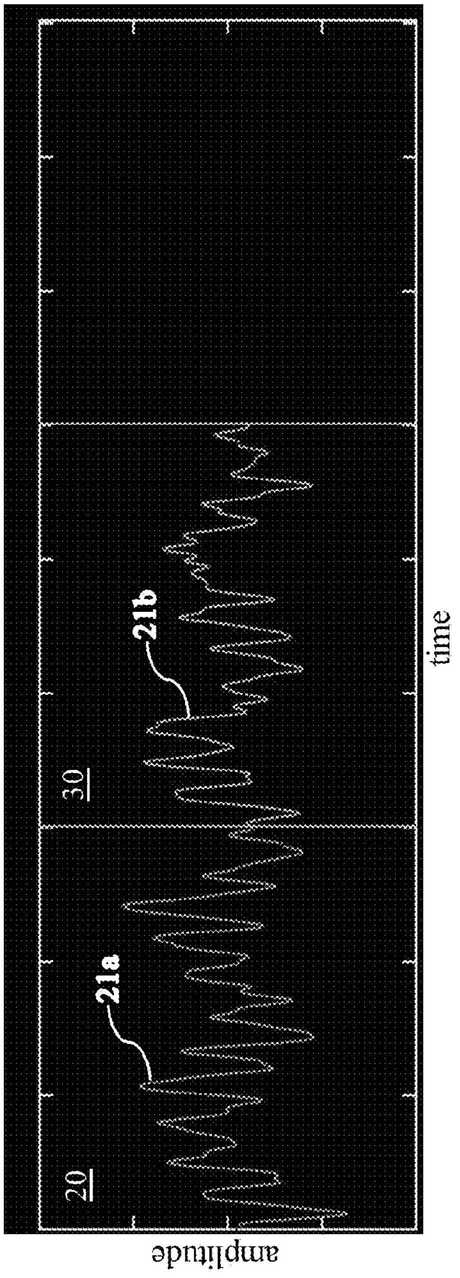
FIG. 10A illustrates an extension of the observed signal from the region of the observed signal before the region having unwanted noise through the region having unwanted noise.
Figure 10B:
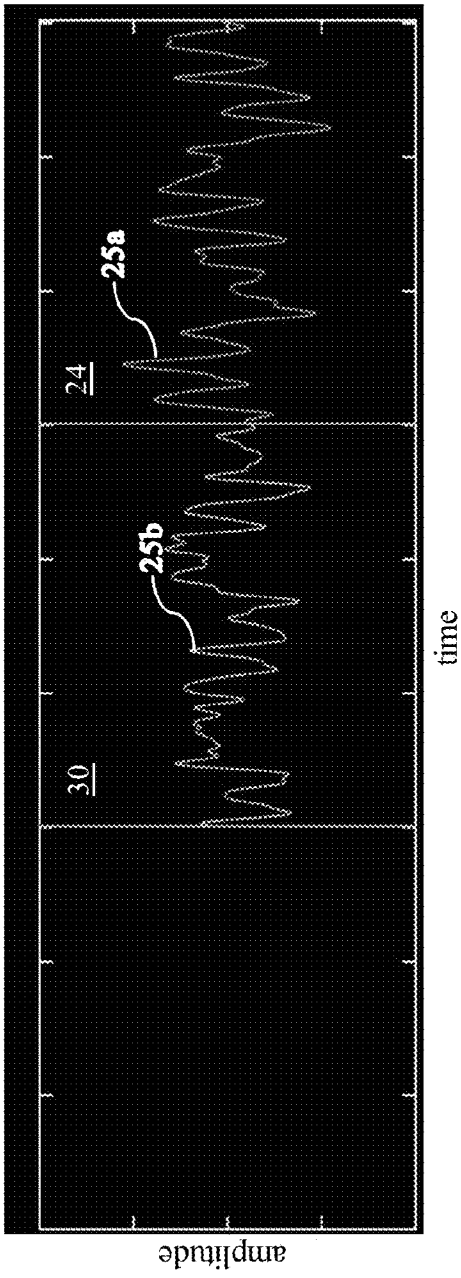
FIG. 10B illustrates an extension of the observed signal through the region having unwanted noise from the region of the observed signal after the region having unwanted noise.

Several approaches are available to estimate a portion of a desired signal to supplant the impaired portion of the observed signal within the frame 30. For example, one or both of segments 21*a*, 25*a* of the observed signal in the respective frames 20, 24 adjacent the removal region 30 can be extended into or across the frame 30, as generally depicted in FIGS. 10A and 10B. The segment 21*a* of the observed signal in the region (or frame) 20 in front of the removal region 30 can be extended forward to generate a corresponding extended segment 21*b* (FIG. 10A). Additionally, or alternatively, the segment of the observed signal 25*a* in the region 24 after the removal region 30 can be extended backward to generate a corresponding extended segment 25*b* (FIG. 10B).

The extended segments 21*b*, 25*b*, if both are generated, can be combined to form the estimated segment 34 of the desired signal within the frame 30. Since those extensions 21*b*, 25*b* likely will differ and thus not identically overlap with each other, the extensions can be cross-faded with each other using known techniques. The cross-faded segment 34 (FIG. 11) can supplant the impaired segment 31 of the observed signal (as by direct overwriting of the segment 31 or by deletion of the segment 31 and filling the resulting gap to "hide" the deletion).

The segments 21*a*, 25*a* can be extended using a variety of techniques. For example, a time-scale of the segments 21*a*, 25*a* can be modified to extend the respective segments of the observed signal into or across the removal region 30. As an alternative, the observed signal can be extended by an autoregressive modeling approach, with or without adapting a width of the removal region 30 and/or the adjacent regions 20, 24, e.g., to account for one or more characteristics (e.g., transients) of the observed signal.

Figure 9A:
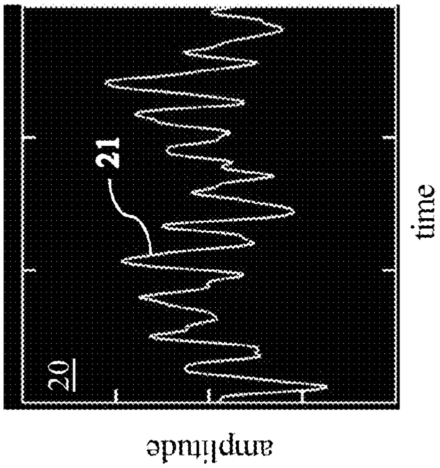
FIG. 9A illustrates the region of the observed signal before the region of unwanted noise shown in FIG. 7.
Figure 9B:
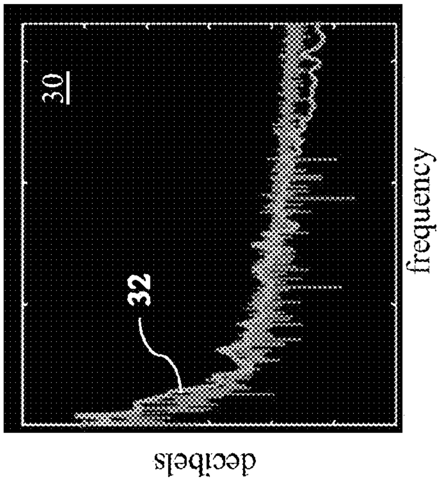
FIG. 9B illustrates an estimate of the spectral shape for the desired signal in the region having unwanted noise based on an extension from the region of the observed signal before the region having unwanted noise.
Figure 9C:
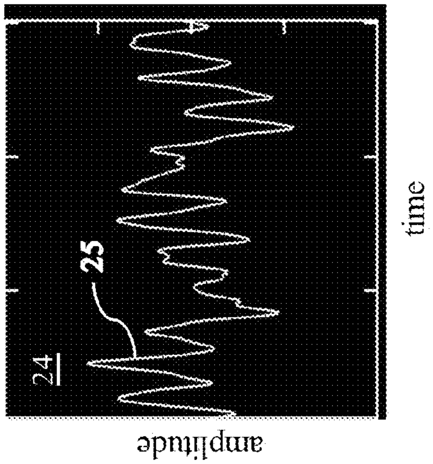
FIG. 9C illustrates the region of the observed signal after the region having unwanted noise shown in FIG. 7.
Figure 9D:
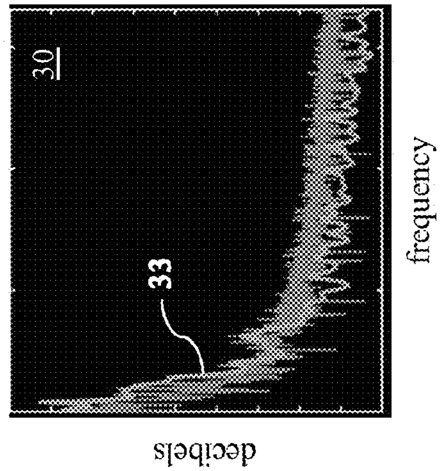
FIG. 9D illustrates an estimate of the spectral shape for the desired signal in the region having unwanted noise based on an extension from the region of the observed signal after the region having unwanted noise.

Autoregressive (AR) modeling is a method that is commonly used in audio processing, especially with speech, for determining a spectral shape of a signal. AR modeling can be a suitable approach insofar as it can capture spectral content of a signal while allowing an extension of the signal to maintain the spectral shape 32, 33 (FIGS. 9B and 9D).

In one approach, AR coefficients for both a forward extension 21*b* of the segment 21*a* and a backward extension 25*b* of the segment 25*a* can be determined using Burg's method (e.g., as opposed to, for example, Yule-Walker equations):

$$A(z)=1-\Sigma_{k=1}^{P}\alpha(k)z^{-k}$$

The original signal can be inversed filtered to obtain an excitation signal:

$$E(z)=A(z)X(z)$$

and the front and rear regions of the observed signal can be extended by combining the excitation signal with the AR coefficients corresponding to the respective front and rear regions. For example, the well-known computational tool Matlab has a function filtic( ) that returns initial conditions of a filter, which allows extension of the front and rear regions of the observed signal. The extensions 21*b* and 25*b* can then be cross-faded with each other.

Line Spectral Pairs Polynomials can extend the excitation signal across the removal region. For example, after estimating the AR coefficients, two polynomials P and Q can be generated by flipping an order of the AR coefficients, shifting them by one and adding them back:

$$P(z)=A(z)+z^{-(P+1)}A(z^{-1})$$

$$Q(z)=A(z)-z^{-(P+1)}A(z^{-1})$$

To make use of the Line Spectral Pairs, a function D can be defined as a weighted combination:

$$D(z,n)=\eta P(z)+(1-\eta)Q(z)$$

Figure 12B:
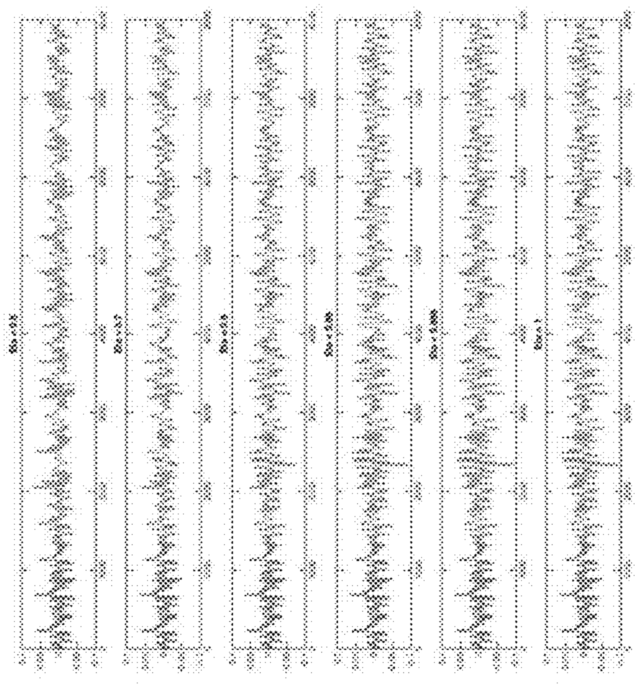
FIG. 12B illustrates examples of unstable extended signals.
Figure 12A:
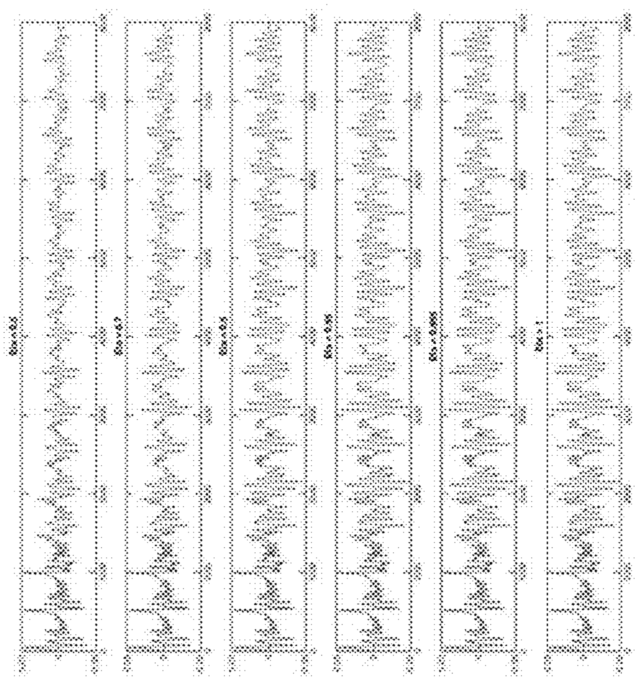
FIG. 12A illustrates examples of extended signals.

For example, D equals A, the AR polynomial, when η equals 0.5. The Line Spectral Pairs Polynomial can be used to extend the excitation signal, as depicted in FIG. 11C. However, as depicted by a comparison of the extended signals shown in FIGS. 12A and 12B, pushing the poles to the unit circle can cause the signal extensions to become unstable and/or biased toward high frequencies.

2. Estimating a Desired Signal with Adjacent Transients

Figure 13A:
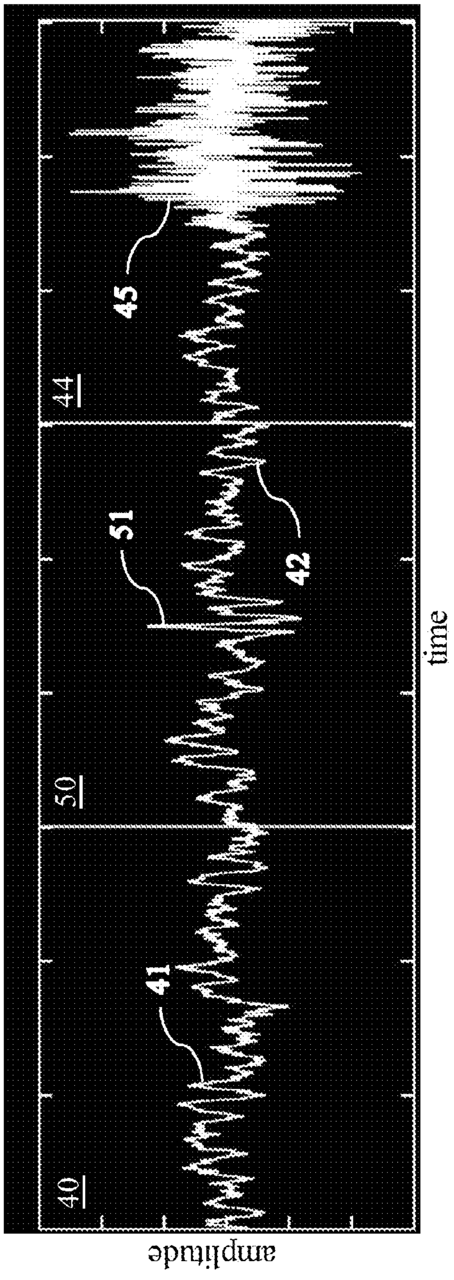
FIG. 13A illustrates a portion of an observed signal including a region having unwanted noise positioned between a region before and a region after. The spectral energy of the signal changes in the region after the region having unwanted noise.
Figure 13B:
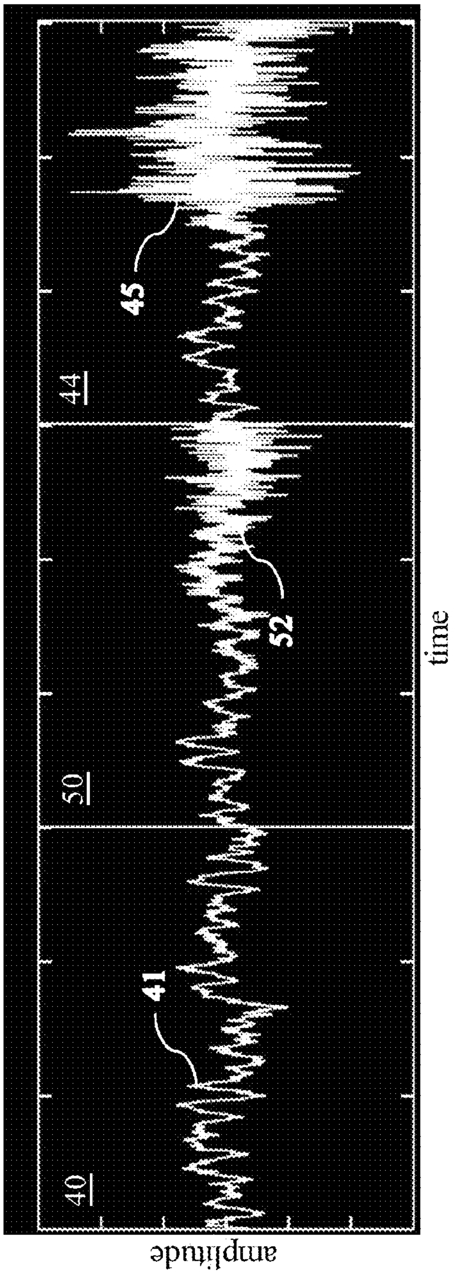
FIG. 13B illustrates an artifact in the region originally having the unwanted noise after processing the signal shown in FIG. 13A without addressing the transient in the region after the region having unwanted noise.

Standard autoregressive models work well when the observed signal is stationary in the look-back region 24 and in the look-ahead region 20 relative to the removal region 30. However, when an observed signal 41, 42, 51, 45 contains a transient 45 in either region 40, 44, as in FIG. 13A, conventional autoregressive models can extend the transient 45 into the gap 50 and accentuate the transient, introducing an undesirable artifact 52 into the processed signal, as shown in FIG. 13B.

To account for transients in the segments of the observed signal falling in the regions 40, 44 adjacent the removal region 50, a width of the adjacent training regions 40, 44 can be adjusted, or "adapted," to avoid the transient portions 45. Further, the weighted line spectral pairs can control an excitation level.

Figure 14:
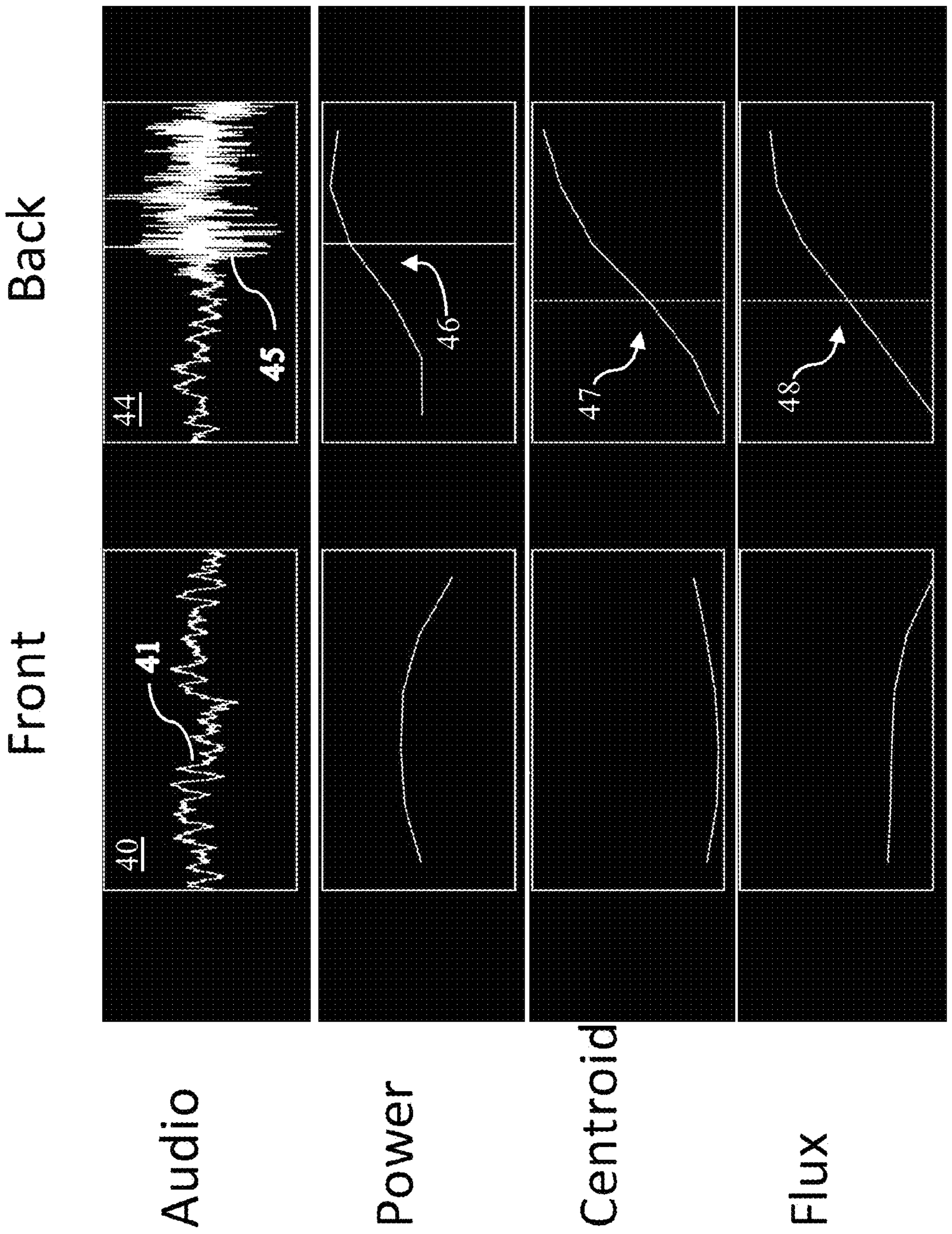
FIG. 14 illustrates several measures of transients in a segment of a signal.

In an attempt to avoid such artifacts, several measures of the observed signal in the adjacent regions 40, 44 can be considered, as in FIG. 14 by way of example. For example, a power envelope, spectral centroid and spectral flux can be considered, as well as an autoregressive order. And, a width of the removal region 30, 50 can be selected in correspondence with a width of the component 31, 51 of the unwanted target signal such that a measure of the observed signal ahead of the removal region and the measure of the observed signal after the removal region are within a selected range of each other.

Figure 15:
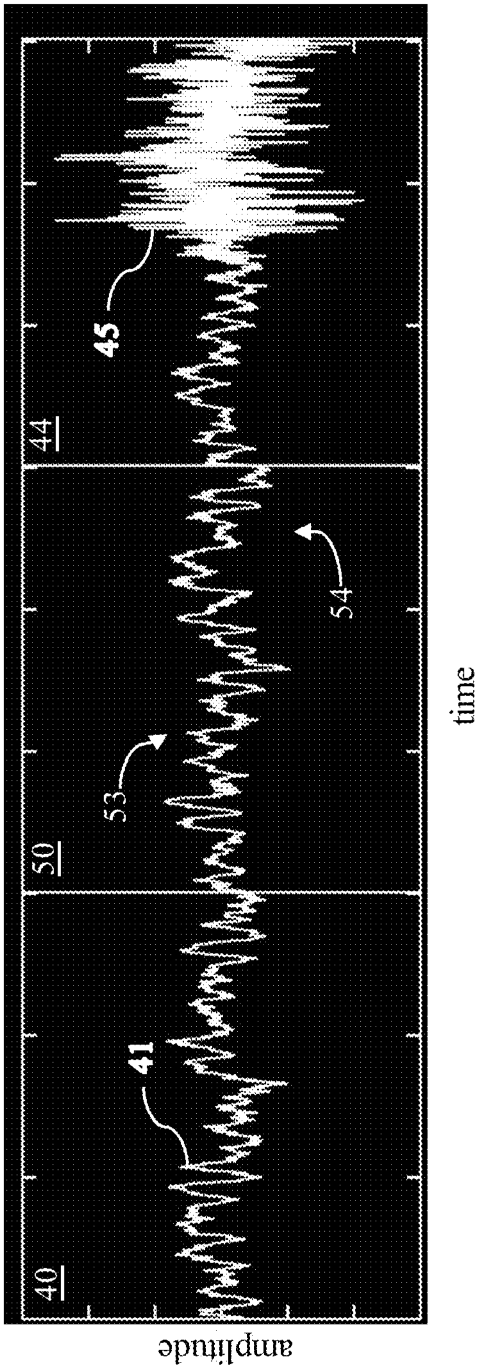
FIG. 15 illustrates a processed signal after adapting the duration of the region after the region having unwanted noise to avoid or reduce the influence of the transient in the region after the region having unwanted noise shown in FIG. 12.

As shown in FIG. 14, assessment of the three measures (power envelope 46, spectral centroid 47, and spectral flux 48) indicate less of the back region 44 should be used for training the extension. Shortening the region 44 to avoid the transient 45 permits the autoregressive modeling to extend the signal without introducing (or introducing only a small or imperceptible) artifact in the removal region. As shown in FIG. 15, after cross-fading the extensions 53, 54, the estimate lacks an artifact from the transient 45.

3. Band-Wise Gap Filling

In some instances, a component of the unwanted target signal within the removal region includes content of the observed signal within a selected frequency band. Such content of the observed signal within the selected frequency band can be supplanted on a band-by-band basis, as by replacing a portion of the observed signal with an estimate of content of the desired signal within the selected frequency band. As above, such an estimate can be a perceptual equivalent, or an acceptable perceptual equivalent, to the original, unimpaired version of a desired signal.

VII. Region-Aware Detection, Removal and Gap Filling

1. Overview

Figure 16:
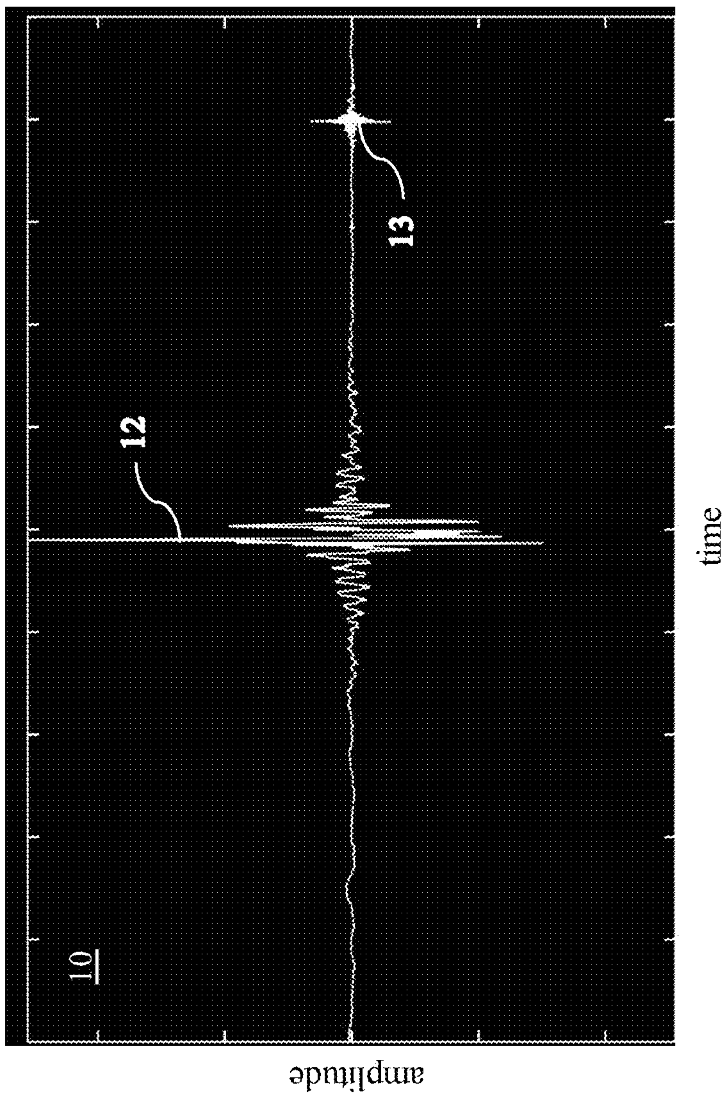
FIG. 16 illustrates another example of a signal containing unwanted noise, similar to the signal in FIG. 2. However, the signal shown in FIG. 16 includes a secondary noise component not shown in FIG. 2.
Figure 17:
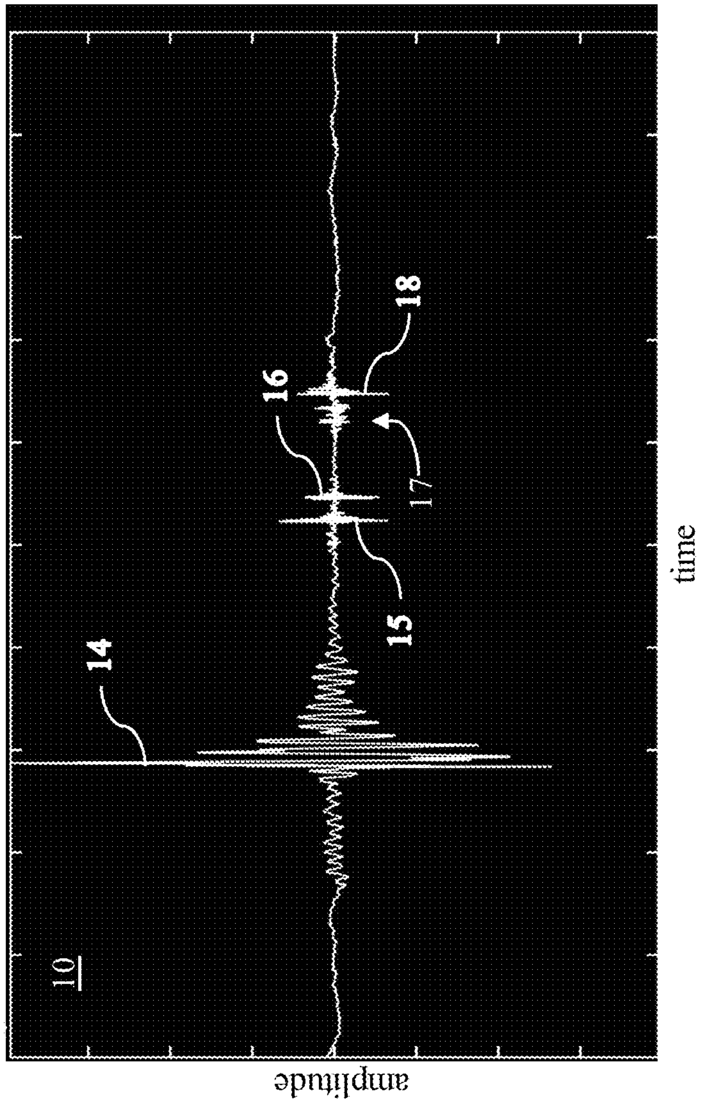
FIG. 17 illustrates yet another example of a signal containing unwanted noise, similar to the signals in FIGS. 2 and 16. However, the signal shown in FIG. 17 includes several secondary noise components lacking from the signals shown in FIGS. 2 and 16.

As depicted in FIGS. 16 and 17, some target signals have a primary component 12, 14 and one or more secondary components 13 (FIG. 16) 15, 16, 17, 18 (FIG. 17). The primary component 12, 14 can generate a relatively higher variance than a corresponding secondary component, and the primary component can thus be detected by a detector in a manner described above. A secondary component, however, might otherwise not be detectable (e.g., a "signal-to-noise" ratio of a secondary component of a target signal relative to an observed signal might be too low). As well, or alternatively, a secondary component might be too close to another noise component to be removed individually without creating an audible artifact in the estimated signal, as described above.

2. Detection

Accordingly, disclosed detectors can be trained to look ahead or behind in relation to a detected primary target 12, 14. A window size of the look ahead/behind region can be adapted during training of the detector according to the target signal(s) characteristics.

Figure 18:
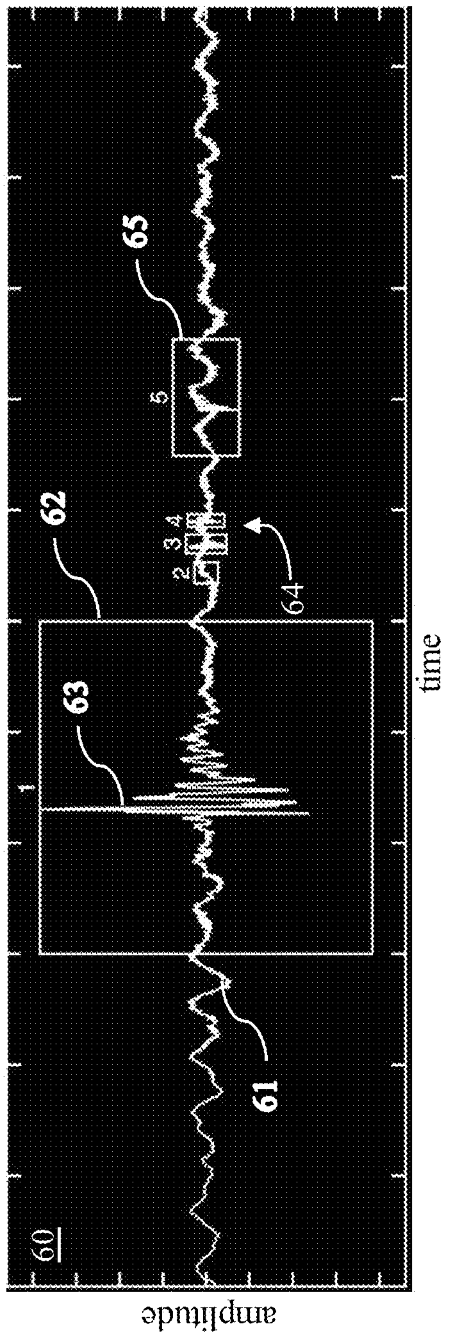
FIG. 18 illustrates an observed signal containing unwanted noise similar to the unwanted noise depicted in FIG. 17.

Referring now to FIG. 18, a primary component 63 can be detected within an observed signal 61. The detector can look ahead and behind the frame 62 containing the primary component 63 to detect, for example, additional components 64, 65.

With such secondary component detectors, secondary targets 64, 65 that would otherwise remain or appear in the processed signal as an artifact can be identified and supplanted. Secondary components can result from, for example, initial contact between a user's finger and an actuator before actuation thereof that can give rise to a primary component, as well as release of an actuator and other mechanical actions. If the gap-filling techniques described herein thus far are applied to observed signals containing such secondary components, the secondary components can be unintentionally reproduced and/or accentuated.

3. Removal and Gap-Filling

Under one approach, the secondary components 64, 65 of a target signal can be supplanted in conjunction with supplanting nearby primary components 63. Accordingly, one or more narrower removal regions within the observed signal can be defined to, initially, correspond to each of the one or more other components 64, 65 of the unwanted target signal, as generally depicted in FIG. 18 (e.g., each respective initially defined removal region is numbered 1 through 5).

Primary and secondary target signal components can be grouped together if they are found to be within a selected time (e.g., about 100 ms, such as, for example, between about 80 ms and about 120 ms, with between 90 ms and 110 ms being but one particular example) of each other, as with the secondary components shown in the frame 60.

Figure 19:
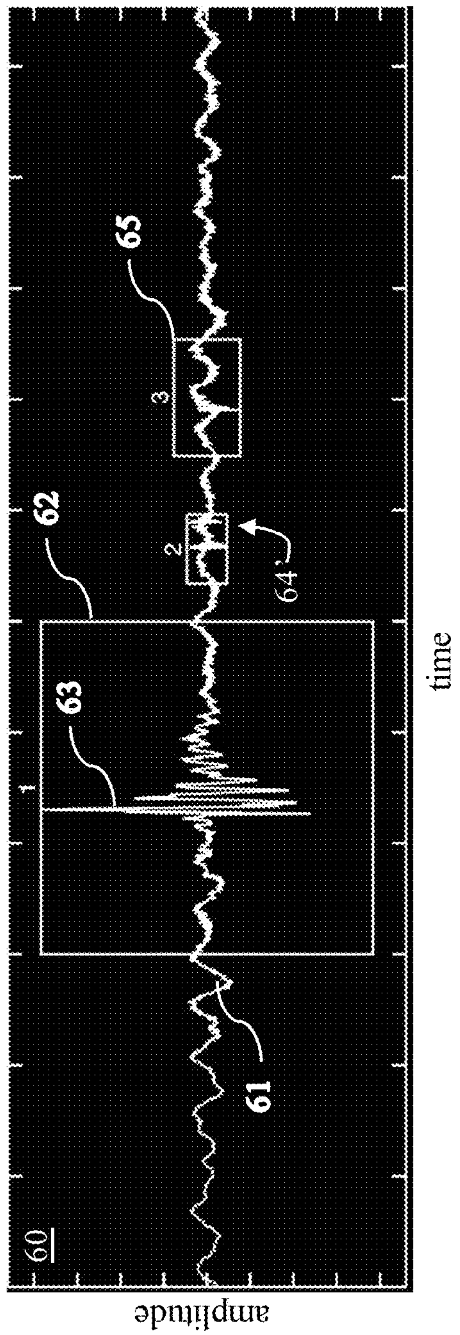
FIG. 19 illustrates the observed signal shown in FIG. 18 with regions to be processed to remove unwanted noise. Several closely spaced regions containing unwanted noise in FIG. 18 are merged together in FIG. 19.

However, if adjacent segments of an observed signal 61 between adjacent removal regions 64 are too close together, e.g., less than about 5 ms, such as for example between about 3 ms and about 5 ms apart, insufficient observed signal can be available for training the extensions used to supplant the secondary components of the target signal. Consequently, the adjacent removal regions 64 can be merged into a single removal region 64' (FIG. 19).

Figure 20:
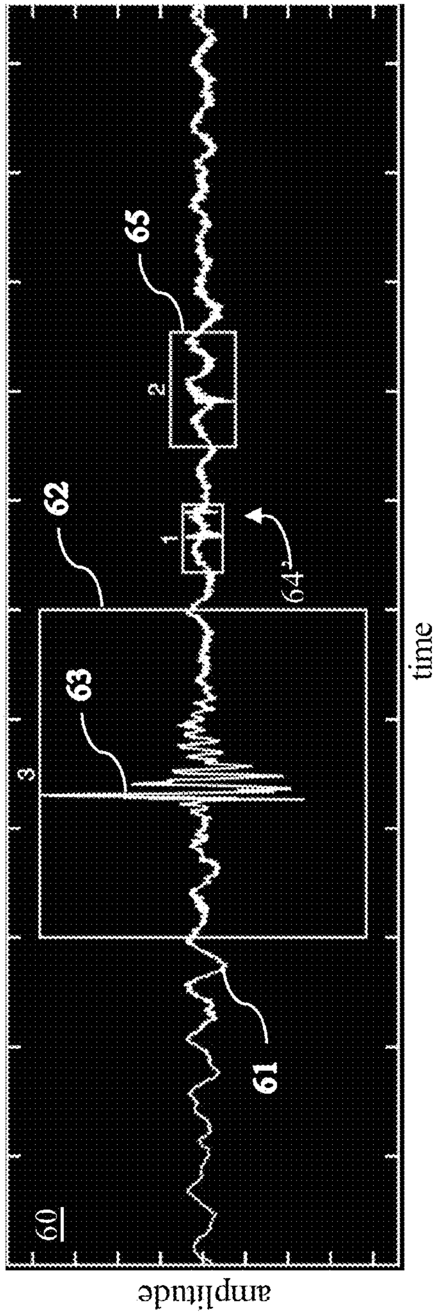
FIG. 20 illustrates the observed signal shown in FIGS. 18 and 19 with the regions to be processed to remove unwanted noise prioritized for processing.
Figure 21:
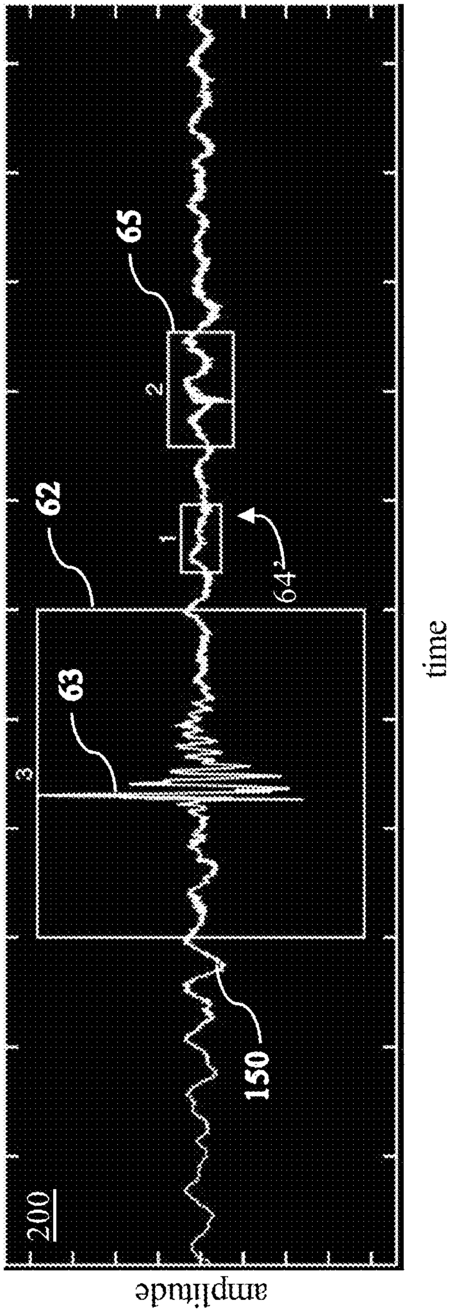
FIG. 21 illustrates the observed signal shown in FIGS. 18, 19, and 20, after processing region 1 to remove unwanted noise as disclosed herein.
Figure 22:
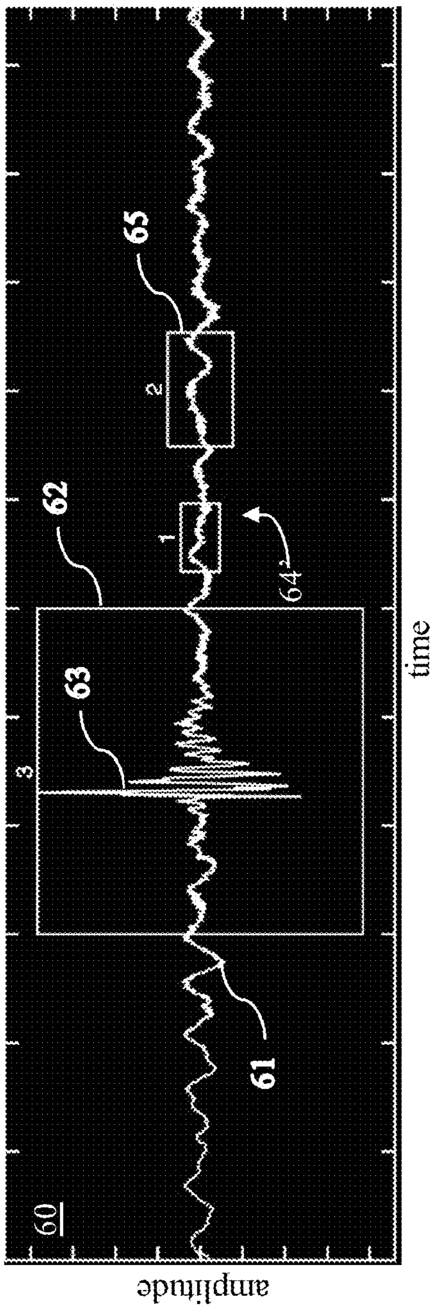
FIG. 22 illustrates the signal shown in FIG. 21 after further processing region 2 to remove unwanted noise as disclosed herein.
Figure 23:
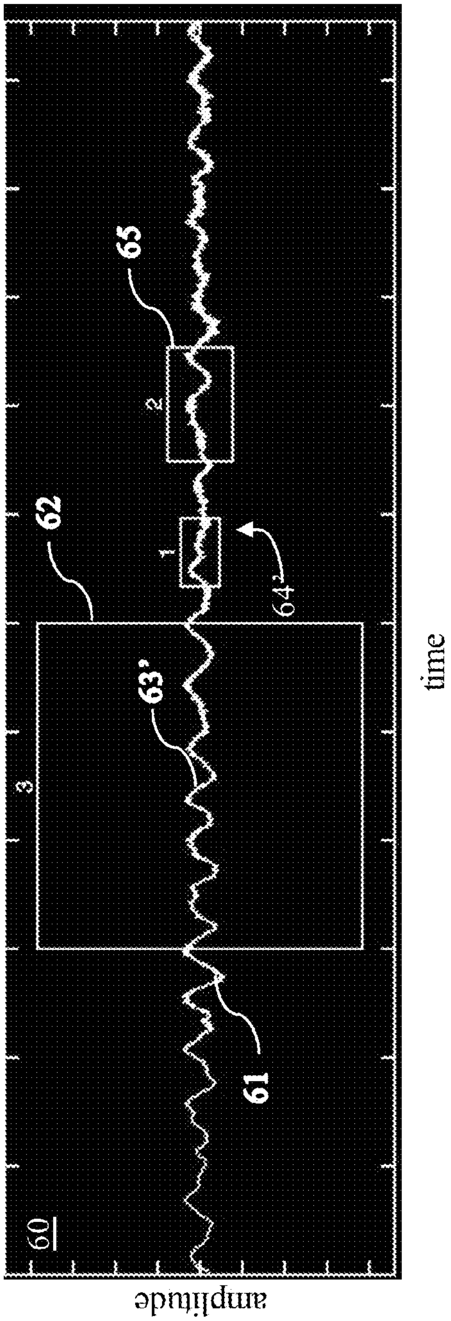
FIG. 23 illustrates the signal shown in FIG. 22, after further processing region 3 to remove unwanted noise as disclosed herein.

After merging, the remaining frames 62, 64' and 65 containing components of the target signal can be ordered from smallest to largest, as in FIG. 20. The resulting order of the frames, from smallest to largest, in FIG. 20 is 64', 65, 62. After sorting, the impaired signals within each frame can be supplanted by an estimate of a desired signal, one-by-one according to frame width, from smallest frame 64' to largest frame 62, as shown by the sequence of plots in FIG. 20

VIII. Working Embodiment and User Trials

A working embodiment of disclosed systems was developed and several user trials were performed to assess perceptual quality of disclosed approaches. A listening environment matching that of a good speaker system was set up with levels set to about 10 dB higher than THX® reference; −26 dB full scale mapped to an 89 dB sound pressure level (e.g., a loud listening level). Eight subjects were asked to rate perceived sound quality of a variety of audio clips. During the test, users heard a clean audio clip without a click and audio clips with the click removed using various embodiments of disclosed approaches. The order of clip playback was randomized so the user didn't know which clip was the original.

Then, users were asked to rate the quality of the audio clip with the click removed on a scale from 5 to 1, as follows:

5—imperceptible
4—perceptible, but not annoying (suitably imperceptible)
3—slightly annoying
2—annoying
1—very annoying For comparison, the test was performed with a multi band approach, a naive AR with 50 coefficients, a naive AR with 1000 coefficients, and time scale modification. Results are shown in FIGS. 24, 25, and 26.

Figure 24:
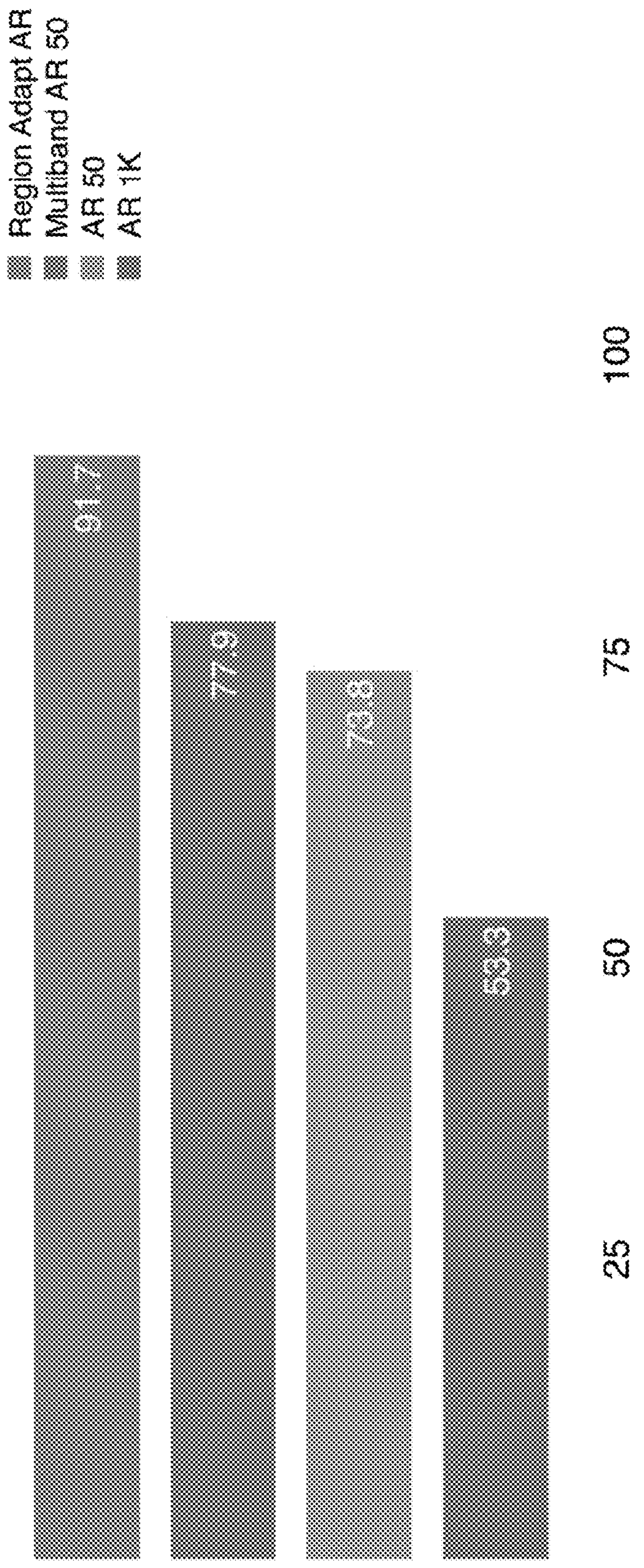
FIGS. 24, 25, and 26 illustrate perceptual measures of audio quality after processing signals with unwanted noise according to techniques disclosed herein.
Figure 25:
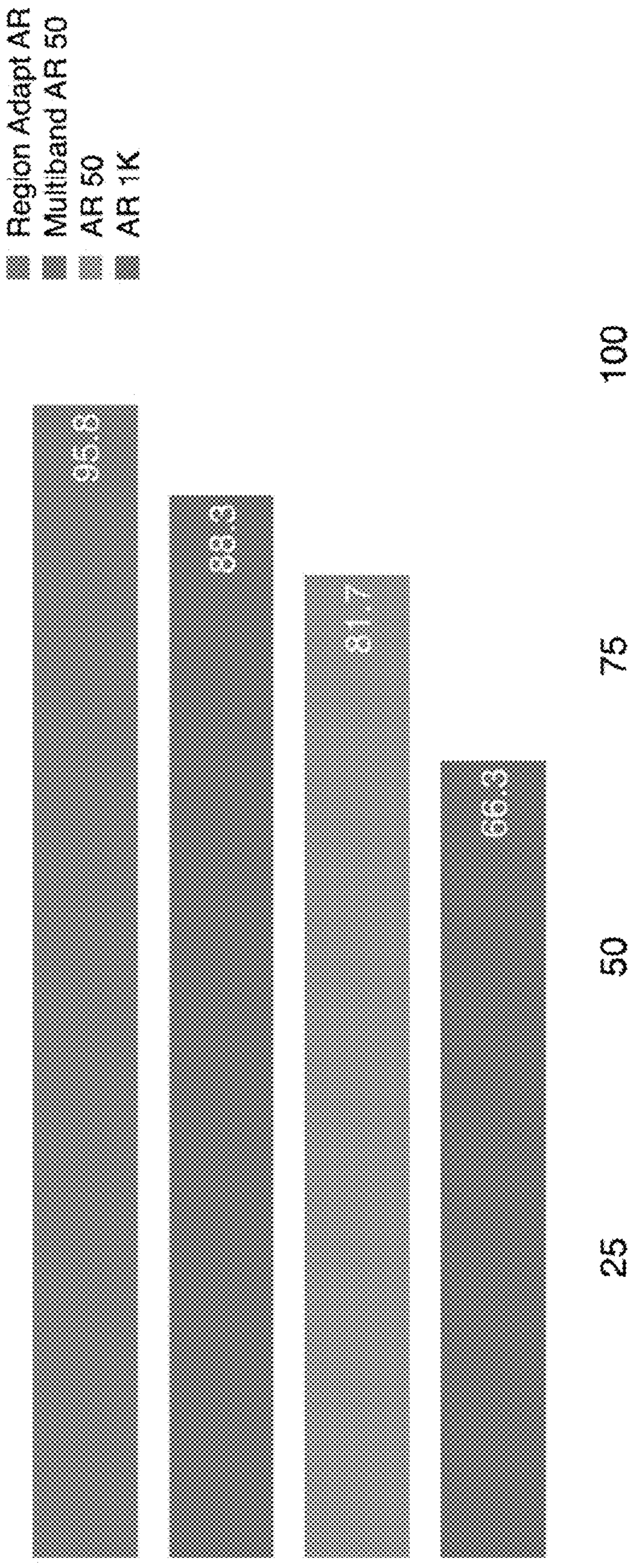

In all cases, disclosed approaches scored a 5 (e.g., were perceptual equivalents to the original, unimpaired signal) for over 90% of the cases run, as shown in FIG. 24. Clips where a click was perceptible, but not annoying were deemed to be acceptable as a perceptual equivalent to the original, unimpaired signal. According to that measure, disclosed methods and systems were satisfactory in over 95% of cases tested, as shown in FIG. 25.

Figure 26:
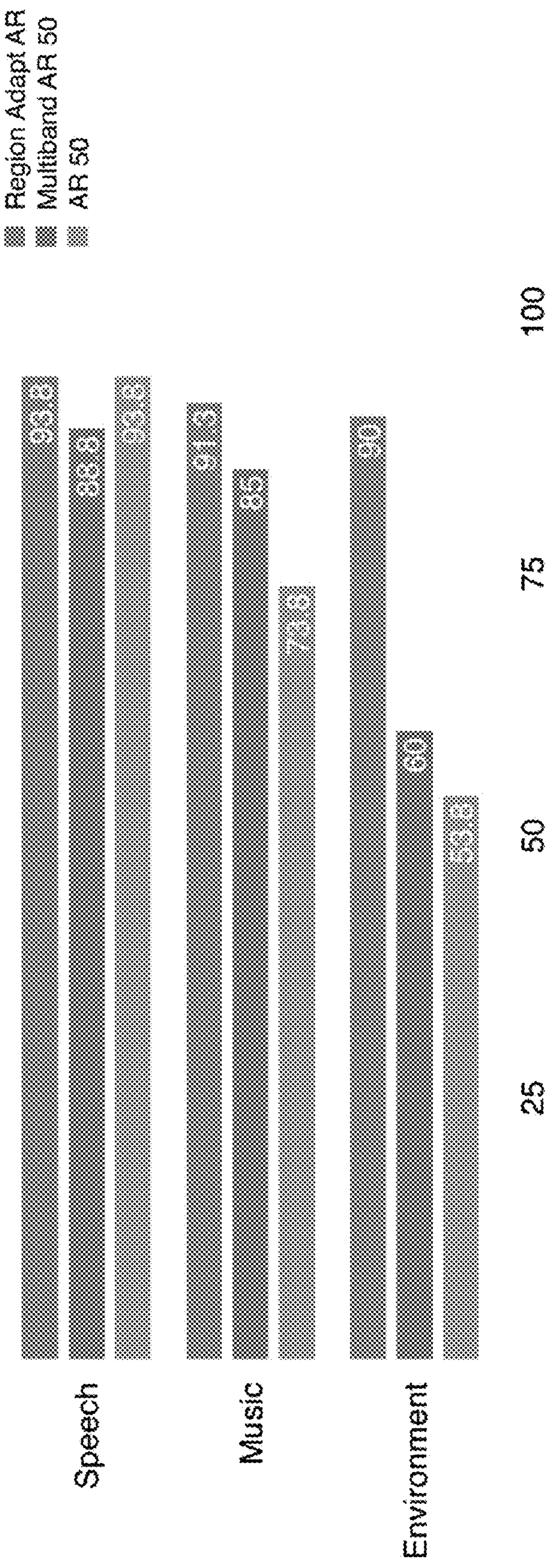
Figure 27:
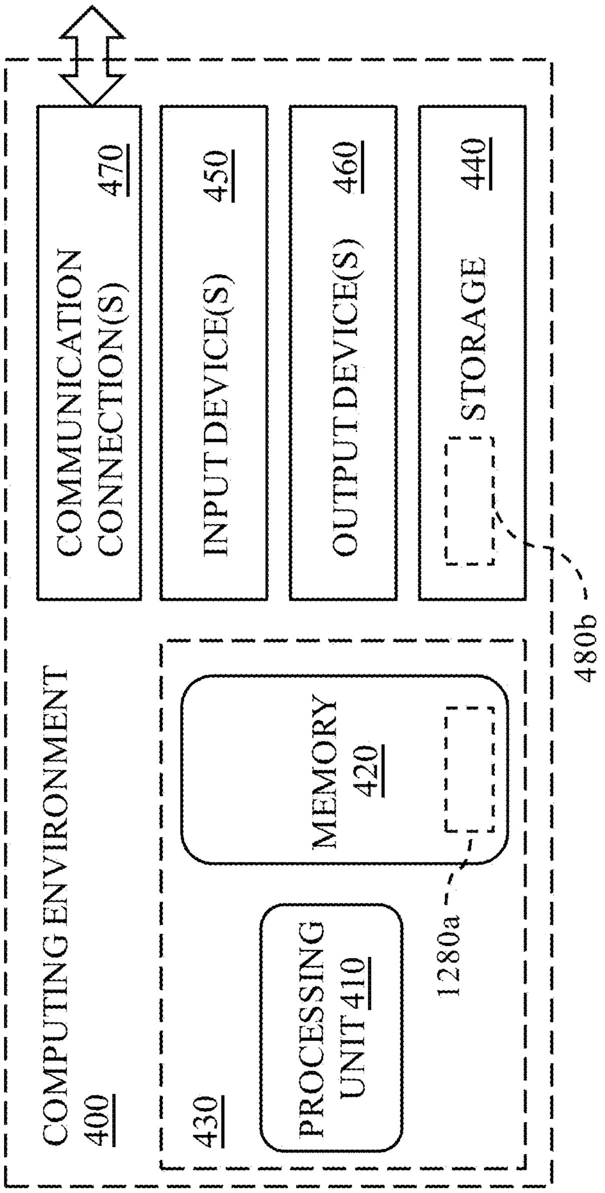
FIG. 27 illustrates a block diagram of a computing environment as disclosed herein.

As shown in FIG. 26, disclosed methods outperform prior approaches in all instances and perform markedly better where music or textured sound (e.g., street noise, a caf) makes up the desired signal.

IX. Computing Environments

FIG. 28 illustrates a generalized example of a suitable computing environment 400 in which described methods, embodiments, techniques, and technologies relating, for example, to detection and/or removal of unwanted noise signals from an observed signal can be implemented. The computing environment 400 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and handheld devices (e.g., a mobile-communications device, or, more particularly but not exclusively, IPHONE®/IPAD® devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 400 includes at least one central processing unit 410 and memory 420. In FIG. 28, this most basic configuration 430 is included within a dashed line. The central processing unit 410 executes computer-executable instructions and may be a real or a virtual processor. In a multi-processing system, multiple processing units execute computer-executable instructions to increase processing power and as such, multiple processors can run simultaneously. The memory 420 may be volatile memory (e.g., registers, cache, RAM), non-volatile memory (e.g., ROM, EEPROM, flash memory, etc.), or some combination of the two. The memory 420 stores software 480*a* that can, for example, implement one or more of the innovative technologies described herein, when executed by a processor.

A computing environment may have additional features. For example, the computing environment 400 includes storage 440, one or more input devices 450, one or more output devices 460, and one or more communication connections 470. An interconnection mechanism (not shown) such as a bus, a controller, or a network, interconnects the components of the computing environment 400. Typically, operating system software (not shown) provides an operating environment for other software executing in the computing environment 400, and coordinates activities of the components of the computing environment 400.

The store 440 may be removable or non-removable, and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 400. The storage 440 stores instructions for the software 480, which can implement technologies described herein.

The store 440 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 450 may be a touch input device, such as a keyboard, keypad, mouse, pen, touchscreen, touch pad, or trackball, a voice input device, a scanning device, or another device, that provides input to the computing environment 400. For audio, the input device(s) 450 may include a microphone or other transducer (e.g., a sound card or similar device that accepts audio input in analog or digital form), or a computer-readable media reader that provides audio samples to the computing environment 400.

The output device(s) 460 may be a display, printer, speaker transducer, DVD-writer, or another device that provides output from the computing environment 400.

The communication connection(s) 470 enable communication over a communication medium (e.g., a connecting network) to another computing entity. The communication medium conveys information such as computer-executable instructions, compressed graphics information, processed signal information (including processed audio signals), or other data in a modulated data signal.

Thus, disclosed computing environments are suitable for transforming a signal corrected as disclosed herein into a human-perceivable form. As well, or alternatively, disclosed computing environments are suitable for transforming a signal corrected as disclosed herein into a modulated signal and conveying the modulated signal over a communication connection Machine-readable media are any available media that can be accessed within a computing environment 400. By way of example, and not limitation, with the computing environment 400, machine-readable media include memory 420, storage 440, communication media (not shown), and combinations of any of the above. Tangible machine-readable (or computer-readable) media exclude transitory signals.

X. Other Embodiments

The examples described above generally concern apparatus, methods, and related systems for removing unwanted noise from observed signals, and more particularly but not exclusively to audio noise in observed audio signals. Nonetheless, embodiments other than those described above in detail are contemplated based on the principles disclosed herein, together with any attendant changes in configurations of the respective apparatus described herein. For example, disclosed systems can be used to process real-time signals being transmitted, as in a telephony application (subject to latency considerations on different computational platforms). Other disclosed systems can be used to process recordings of observed signals. And, disclosed principles are not limited to audio signals, but are generally applicable to other types of signals susceptible to unwanted noise.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of signal processing techniques that can be devised using the various concepts described herein.

Moreover, those of ordinary skill in the art will appreciate that the exemplary embodiments disclosed herein can be adapted to various configurations and/or uses without departing from the disclosed principles. Applying the principles disclosed herein, it is possible to provide a wide variety of systems adapted to remove impairments from observed signals. For example, modules identified as constituting a portion of a given computational engine in the above description or in the drawings can be omitted altogether or implemented as a portion of a different computational engine without departing from some disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the features and method acts of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We currently claim:

1. An electronic device having a processor, a communication connection, and a tangible, machine-readable medium containing machine-executable instructions that, when executed, cause the electronic device:

to receive over the communication connection an observed signal corresponding to an output from a transducer exposed to an environmental signal;

to detect at least two components of an unwanted target signal within the observed signal;

to select a removal region of the observed signal corresponding to each component of the unwanted target signal, wherein a width of each respective removal region corresponds with a width of the respective component of the unwanted target signal such that a measure of the observed signal ahead of each respective removal region and the measure of the observed signal after each respective removal region are within a selected range of each other;

to group at least two of the removal regions together when a separation between the respective removal regions is below an upper threshold separation;

to supplant each of the grouped removal regions with an estimate of a corresponding portion of a desired signal based on the observed signal in a region adjacent the grouped removal regions to form a corrected signal; and to output a signal corresponding to the corrected signal over the communication connection.

2. The electronic device according to claim 1, wherein the region adjacent the grouped removal regions comprises a region in front of the grouped removal regions and a region after the grouped removal regions, and wherein the estimate comprises a combination of a forward extension of the observed signal from the region in front of the grouped removal regions and a backward extension of the observed signal from the region after the grouped removal regions.

3. The electronic device according to claim 2, wherein the forward extension from the region in front of the grouped removal regions and/or the backward extension from the region after the grouped removal regions corresponds to an autoregressive model of spectral content in the grouped removal regions based on the observed signal in the respective region in front of and/or after the grouped removal regions, respectively.

4. The electronic device according to claim 1, wherein at least one component of the unwanted target signal within the corresponding removal region comprises content of the observed signal within a selected frequency band, and the act of supplanting the respective component of the unwanted signal comprises supplanting the content of the observed signal within the selected frequency band with an estimate of content of the desired signal within the frequency band.

5. The electronic device according to claim 1, wherein the instructions further cause the electronic device to merge at least two of the removal regions together.

6. The electronic device according to claim 1, wherein the instructions, when executed, further cause the electronic device to order the grouped removal regions according to width from smallest width to largest width, and to supplant the respective components of the unwanted signal proceeds in order of removal regions according to width from smallest width to largest width.

7. The electronic device according to claim 1, wherein the instructions, when executed, further cause the electronic device to merge two or more of the grouped removal regions together when the separation between the two or more removal regions is below a lower threshold separation.

8. The electronic device according to claim 1, wherein the instructions, when executed, further cause the electronic device to select a width of the region adjacent the grouped removal regions based at least in part on a measure of signal variation within a portion of the observed signal positioned adjacent the grouped removal regions.

9. The electronic device according to claim 8, wherein the instructions, when executed, further cause the electronic device to select width of the region adjacent the grouped removal regions to maintain variation of the portion of the observed signal within the region adjacent the grouped removal regions below a predetermined upper threshold variation.

10. The electronic device according to claim 1, wherein the instructions, when executed, further cause the electronic device to transform the corrected signal into a human-perceivable form, and/or cause the electronic device to transform the corrected signal into a modulated signal and to convey the modulated signal over flail the communication connection.

11. The electronic device according to claim 1, wherein the instructions, when executed, further cause the electronic device to convert an audio signal into a computer-readable representation of the audio signal, wherein the observed signal comprises the machine-readable representation of the audio signal.

12. The electronic device according to claim 1, wherein the environmental signal comprises an audio signal and the unwanted target signal corresponds to an unwanted audio signal.

13. The electronic device according to claim 12, wherein the unwanted audio signal comprises an audio signal generated by one or more of a screen tap, a rub against the electronic device, and activation of a mechanical actuator.

14. An audio system having a processor, an input device, an output device, and a tangible, machine readable medium containing machine-executable instructions that, when executed, cause the audio system:

to receive with the input device an observed signal corresponding to an environmental signal;

to detect at least two components of an unwanted target signal within the observed signal;

to select a removal region of the observed signal corresponding to each component of the unwanted target signal, wherein a width of each respective removal region corresponds with a width of the respective component of the unwanted target signal such that a measure of the observed signal ahead of each respective removal region and the measure of the observed signal after each respective removal region are within a selected range of each other to supplant each of the grouped removal regions with an estimate of a corresponding portion of a desired signal based on the observed signal in a region adjacent the grouped removal regions to form a corrected signal; and to output a signal corresponding to the corrected signal over a communication connection or from an output device.

15. The audio system according to claim 14, wherein the instructions, when executed, further cause the audio system to merge at least two of the removal regions together when a separation between the respective removal regions is below a lower threshold separation.

16. The audio system according to claim 14, wherein the instructions, when executed, further cause the audio system to order the grouped removal regions according to width from smallest width to largest width, and to supplant each respective removal region in order of removal region width from smallest width to largest width.

17. The audio system according to claim 14, wherein the instructions that, when executed, cause the audio system to group at least two of the removal regions together cause the audio system to merge at least of the removal regions together.

18. The audio system according to claim 14, wherein the environmental signal comprises an audio signal and the unwanted target signal corresponds to an unwanted audio signal.

19. The audio system according to claim 18, wherein the unwanted audio signal comprises an audio signal generated by one or more of a screen tap, a rub against the electronic device, and activation of a mechanical actuator.

20. An audio system having a processor, an input device, an output device, and a tangible, machine-readable medium containing machine-executable instructions that, when executed, cause the audio system:

to receive with the input device an observed signal corresponding to an environmental signal;

to detect a first component and a second component of an unwanted target signal within the observed signal;

to select a first removal region of the observed signal in correspondence with a width of the first component of the unwanted target signal such that a measure of the observed signal ahead of the first removal region and the measure of the observed signal after the first removal region are within a selected range of each other, and to select a second removal region of the observed signal in correspondence with a width of the second component of the unwanted target signal;

to merge the first and the second removal regions together when a separation between the respective removal regions is below a lower threshold separation;

to supplant the removal region of the observed signal with an estimate of a desired signal based on the observed signal in the training region adjacent the merged first and the second removal regions to form a corrected signal; and to output a signal corresponding to the corrected signal over a communication connection or from an output device.

* * * * *